United States Patent
Sakano et al.

(10) Patent No.: US 12,227,667 B2
(45) Date of Patent: Feb. 18, 2025

(54) FLUORINE-CONTAINING CURABLE COMPOSITION AND ARTICLE

(71) Applicant: SHIN-ETSU CHEMICAL CO., LTD., Tokyo (JP)

(72) Inventors: Yasunori Sakano, Annaka (JP); Tomoyuki Asahi, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 277 days.

(21) Appl. No.: 17/764,685

(22) PCT Filed: Sep. 17, 2020

(86) PCT No.: PCT/JP2020/035174
§ 371 (c)(1),
(2) Date: Mar. 29, 2022

(87) PCT Pub. No.: WO2021/065527
PCT Pub. Date: Apr. 8, 2021

(65) Prior Publication Data
US 2022/0340716 A1 Oct. 27, 2022

(30) Foreign Application Priority Data
Sep. 30, 2019 (JP) .................. 2019-179708

(51) Int. Cl.
| C09D 171/00 | (2006.01) |
| C08G 65/00 | (2006.01) |
| C08G 65/336 | (2006.01) |
| C08G 77/46 | (2006.01) |
| C09D 133/06 | (2006.01) |
| C09D 163/00 | (2006.01) |
| C09D 175/04 | (2006.01) |
| C08G 77/18 | (2006.01) |
| C08G 77/24 | (2006.01) |

(52) U.S. Cl.
CPC ......... *C09D 171/00* (2013.01); *C08G 65/007* (2013.01); *C08G 65/336* (2013.01); *C08G 77/46* (2013.01); *C09D 133/06* (2013.01); *C09D 163/00* (2013.01); *C09D 175/04* (2013.01); *C08G 77/18* (2013.01); *C08G 77/24* (2013.01); *C08G 2650/48* (2013.01)

(58) Field of Classification Search
CPC ... C09D 171/00; C09D 171/02; C08G 65/336
See application file for complete search history.

(56) References Cited

U.S. PATENT DOCUMENTS

| 4,647,413 | A | * | 3/1987 | Savu .................... C07D 239/26 560/45 |
| 7,803,894 | B2 | * | 9/2010 | Dams ................. C08G 18/3812 528/29 |
| 2010/0024685 | A1 | | 2/2010 | Sakano et al. |
| 2010/0147191 | A1 | | 6/2010 | Sakano et al. |
| 2010/0203320 | A1 | | 8/2010 | Yoshikawa et al. |
| 2010/0317875 | A1 | | 12/2010 | Sakano et al. |
| 2012/0077041 | A1 | | 3/2012 | Yamane et al. |
| 2012/0270057 | A1 | * | 10/2012 | Yamane ............... C08G 65/007 428/428 |
| 2014/0113145 | A1 | | 4/2014 | Yamane et al. |

FOREIGN PATENT DOCUMENTS

| JP | 2010-53114 A | 3/2010 |
| JP | 2010-138112 A | 6/2010 |
| JP | 2010-180375 A | 8/2010 |
| JP | 2010-285501 A | 12/2010 |
| JP | 2011-241190 A | 12/2011 |
| JP | 2012-72272 A | 4/2012 |
| JP | 2014-84405 A | 5/2014 |
| WO | WO 2015/190526 A1 | 12/2015 |

OTHER PUBLICATIONS

International Search Report (PCT/ISA/210) issued in PCT/JP2020/035174 mailed on Dec. 8, 2020.
Written Opinion (PCT/ISA/237) issued in PCT/JP2020/035174 mailed on Dec. 8, 2020.

* cited by examiner

*Primary Examiner* — Marc S Zimmer
(74) *Attorney, Agent, or Firm* — Birch, Stewart, Kolasch & Birch, LLP

(57) ABSTRACT

This fluorine-containing curable composition comprises a curable component (A) that provides a cured product under the effect of heat or moisture, and a surface-modifying component (B) that contains a perfluoropolyether compound (b1) having a prescribed structure. The perfluoropolyether compound (b1) in the surface-modifying component (B) is present at 0.005-50 mass parts per 100 mass parts of the curable component (A) excluding volatile components. The fluorine-containing curable composition can be cured by heat or moisture, can be coated on the surface of an article even not containing a fluorine-containing solvent, and can provide the cured product surface with excellent surface characteristics.

19 Claims, No Drawings

FLUORINE-CONTAINING CURABLE COMPOSITION AND ARTICLE

TECHNICAL FIELD

The present invention relates to a fluorine-containing curable composition containing a surface modification component. Particularly, the present invention relates to a fluorine-containing curable composition in which a specific surface modification component is added to a curable composition which is formed into a cured product by heat or moisture, such as a thermosetting resin, a thermosetting hard coat agent or a thermosetting coating material, so that effects derived from a fluoropolyether structure, such as an excellent water/oil-repellent property, anti-fouling property and fingerprint-proof property, can be imparted to a surface of the resulting cured product; and an article having a cured film of a fluorine-containing curable composition on a surface thereof.

BACKGROUND ART

Hard coat agents (or coating materials serving as a hard coat) are applied to surfaces of various articles, typically plastic resins, and cured to protect the surfaces of the articles, and are used in a very wide range of applications as materials capable of imparting new functions to the surfaces of the articles.

With expansion of application of these hard coat agents, they are being required to have further high levels of functions such as a water-repellent property, an oil-repellent property, an anti-fouling property, a fingerprint-proof property, fingerprint removability, slipperiness, abrasion resistance, scratch resistance, solvent resistance, chemical resistance, a liquid droplet slip drop property, a deposited snow slip drop property, a deposited ice slip drop property, an antifogging property, a surface leveling property, a low-refractive-index property and an antireflection property in addition to hardness, abrasion resistance, chemical resistance, durability and the like which have been heretofore required.

The hard coat agents are classified broadly into ultraviolet ray/electron beam-curable hard coat agents and thermosetting hard coat agents. Examples of the ultraviolet ray/electron beam-curable hard coat agent include acrylic group-containing hard coat agents. In recent years, fluorine-containing compounds have been studied which can impart a water/oil-repellent property, anti-fouling property, a fingerprint-proof property and the like to the resulting cured surface by adding a very small amount to the ultraviolet ray-curable hard coat agent in addition to the properties of the hard coat agent before the addition.

For imparting the properties of a fluorine-containing compound to a surface of the curable composition, it may be preferable that the fluorine-containing compound has a fluorine content as high as possible and has a long-chain fluoropolyether structure, but such a compound is poor in compatibility with a non-fluorine compound, and it is necessary to blend a volatile component containing a fluorine-based compound or keep the compounding amount of the compound very low with respect to the entire non-fluorine-based component for suppressing cloudiness of the composition.

On the other hand, in recent years, use of fluorine-containing solvents has tended to be avoided because of environmental concerns, concerns about the health of operators, and the necessity of dedicated excluding equipment different from that for general organic solvents are for safe handling, and anti-fouling additives capable of imparting excellent properties to a surface of a cured product without using a fluorine-containing solvent are required.

In Patent Documents 1 to 4 (JP-A 2010 053114, JP-A 2010-138112, JP-A 2010-285501 and JP-A 2011-241190), the present inventors propose a fluorine-containing compound which is soluble in a non-fluorine organic solvent, can be suitably used as an additive for ultraviolet ray- or electron beam-curable hard coat agents, and is capable of imparting a good water/oil-repellent property, anti-fouling property and fingerprint-proof property to the resulting cured product.

However, sufficient studies have not been conducted on a surface modifier which is a curable composition involving a curing system other than an ultraviolet ray, is easily dissolved in a curable composition without requiring a fluorine-containing solvent, and is capable of imparting performance such as a water/oil-repellent property, an anti-fouling property and a fingerprint-proof property to a surface of the resulting cured product with reliability equalizing or surpassing that of the above-described ultraviolet ray-curable hard coat agent, and there is an increasing demand for a surface modifier that is easily used and easily exhibits performance while meeting such conditions.

PRIOR ART DOCUMENTS

Patent Documents

Patent Document 1: JP-A 2010-053114
Patent Document 2: JP-A 2010-138112
Patent Document 3: JP-A 2010-285501
Patent Document 4: JP-A 2011-241190

SUMMARY OF INVENTION

TECHNICAL PROBLEM

The present invention has been made in view of the above-described circumstances, and an object of the present invention is to provide a fluorine-containing curable composition containing a surface modification component, which can be cured by heat or moisture, can be applied to a surface of an article without containing a fluorine-containing solvent, and is capable of imparting excellent surface properties to a surface of a cured product.

Solution to Problem

The present inventors have extensively conducted studies for achieving the above-described object, and resultantly found that a fluorine-containing curable composition including a curable component (A) which is formed into a cured product by heat or moisture, and a surface modification component (B) containing a perfluoropolyether compound (b1) having a specific structure of general formula (1) as described later, the surface modification component (B) containing 0.005 to 50 parts by weight of the perfluoropolyether compound (b 1) per 100 parts by weight of the curable component (A) excluding volatile components can be applied to a surface of an article without containing a fluorine-containing solvent, and is capable of imparting surface properties derived from a fluoropolyether structure, such as an excellent water/oil-repellent property, anti-fouling property and fingerprint-proof property, to a surface of a cured product. In this way, the present invention has been completed.

Accordingly, the present invention provides the following fluorine-containing curable composition and article.

[1]

A fluorine-containing curable composition including a curable component (A) which is formed into a cured product by heat or moisture; and a surface modification component (B) containing a perfluoropolyether compound (b1) of the following general formula (1), the surface modification component (B) containing 0.005 to 50 parts by weight of the perfluoropolyether compound (b1) per 100 parts by weight of the curable component (A) excluding volatile components:

$$[M_cR_bSi\text{—}Z^2]_a\text{—}Q^1\text{—}Z^1\text{—}Rf\text{—}Z^1\text{—}Q^1\text{—}[Z^2\text{—}SiR_bM_c]_a \quad (1)$$

wherein Rf is a divalent perfluoropolyether group having a numerical average molecular weight of 1,500 to 20,000;

each $Z^1$ is independently a divalent linking group, optionally contains an oxygen atom, a nitrogen atom, a fluorine atom or a silicon atom, and may be a group having a cyclic structure and/or an unsaturated bond;

each $Z^2$ is independently a divalent hydrocarbon group having 2 to 20 carbon atoms, may have a cyclic structure, and optionally contains an intermediate ether bond (—O—);

each $Q^1$ is independently a linking group with a valence of (a+1), has a structure with two or more of a hydrogen atom, a carbon atom, an oxygen atom, a silicon atom and a nitrogen atom, and may have a ring shape;

each a is independently an integer of 1 to 10, each b is independently an integer of 0 to 2, each c is independently an integer of 1 to 3, and b and c on one silicon atom satisfy b+c=3; all "a" number of $Z^2$ in the square bracket in formula (1) are bonded to the silicon atom in the $Q^1$ structure;

each R is independently a monovalent hydrocarbon group having 1 to 6 carbon atoms; and each M is independently a group selected from the group consisting of an alkoxy group having 1 to 10 carbon atoms, an alkoxyalkyl group having 2 to 10 carbon atoms, an alkoxyalkoxy group having 2 to 10 carbon atoms, an acyloxy group having 1 to 10 carbon atoms, an alkenyloxy group having 2 to 10 carbon atoms, and a halogen group.

[2]

The fluorine-containing curable composition according to [1], wherein the surface modification component (B) further contains a non-functional perfluoropolyether compound (b2) of the following general formula (2) at less than 5 mol % per a total of 100 mol % of the perfluoropolyether compound (b1) of general formula (1) and the component (b2), the total amount of the component (b1) and the component (b2) in the surface modification component (B) is 0.005 to 50 parts by weight per 100 parts by weight of the curable component (A) excluding volatile components, and the content of a fluorine-containing solvent having a boiling point of 260° C. or lower at normal pressure is less than 1% by weight with respect to the entire component (B):

$$F\text{—}Rf'\text{—}F \quad (2)$$

wherein Rf' is a divalent perfluoropolyether group having a numerical average molecular weight of 1,500 to 20,000.

[3]

The fluorine-containing curable composition according to [1] or [2], wherein in formulae (1) and (2), Rf and Rf' each include a repeating unit having at least one structure selected from the group of the following divalent perfluoroether groups:

—$CF_2O$—;
—$CF_2CF_2O$—;
—$CF_2CF_2CF_2O$—;
—$CF(CF_3)CF_2O$—;
—$CF_2CF_2CF_2CF_2O$—;
—$CF_2CF_2CF_2CF_2CF_2O$—; and
—$CF_2CF_2CF_2CF_2CF_2CF_2O$—, and a perfluoroalkylene group having 1 to 6 carbon atoms.

[4]

The fluorine-containing curable composition according to any one of [1] to [3], wherein in formulae (1) and (2), Rf and Rf' are each represented by one of:

—$CF_2O(CF_2O)_p(CF_2CF_2O)_qCF_2$—
—$CF_2CF_2O(CF_2O)_p(CF_2CF_2O)_qCF_2CF_2$— wherein p is an integer of 10 to 290, q is an integer of 5 to 170, and p+q is an integer of 15 to 295; the sequence of the repeating units of —$CF_2O$— and —$CF_2CF_2O$— is random; and —$CF(CF_3)[OCF_2CF(CF_3)]_sO(C_uF_{2u}O)_v[CF(CF_3)CF_2O]_tCF(CF_3)$—
—$CF_2CF_2CF_2O[CF(CF_3)CF_2O]tCF_2CF_2$— wherein each of s and t is independently an integer of 1 to 120, s+t is an integer of 4 to 121, u is an integer of 1 to 6, and v is an integer of 0 to 10.

[5]

The fluorine-containing curable composition according to any one of [1] to [4], wherein in formula (1), $Z^2$ is represented by the following formula:
—$(CH_2)_w$— wherein w is an integer of 2 to 20.

[6]

The fluorine-containing curable composition according to any one of [1] to [5], wherein in formula (1), each $Q^1$ is independently a linking group with a valence of (a+1) which has a siloxane structure with at least (a+1) number of silicon atoms, an unsubstituted or halogen-substituted silalkylene structure, a silarylene structure, or a combination of two or more thereof.

[7]

The fluorine-containing curable composition according to any one of [1] to [6], wherein in formula (1), $Q^1$ is a cyclic siloxane structure.

[8]

The fluorine-containing curable composition according to any one of [1] to [7], wherein in formula (1), $Z^1$ is one selected from

—$CH_2CH_2$—;

—$CH_2CH_2CH_2$—;

—$CH_2CH_2CH_2CH_2$—;

—$CH_2OCH_2CH_2$—;

—$CH_2OCH_2CH_2CH_2$—

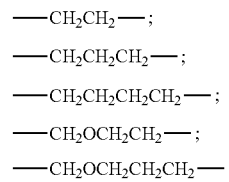

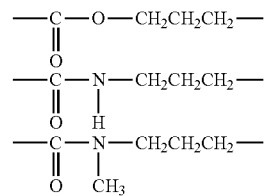

[Chem. 1]

-continued

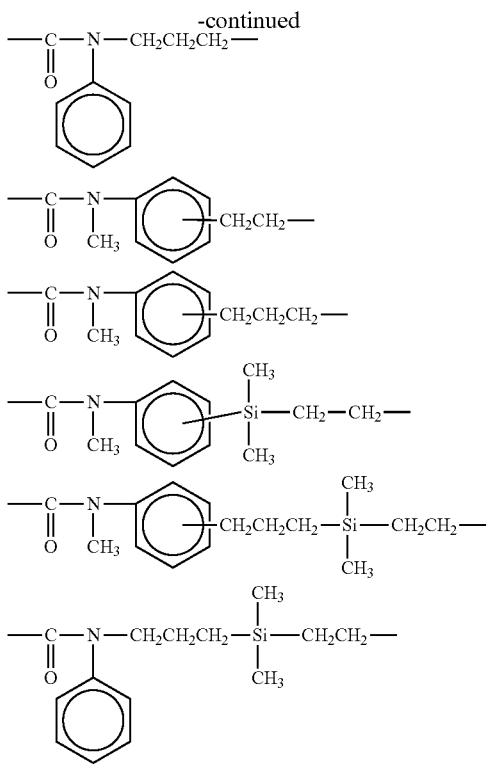

[9]

The fluorine-containing curable composition according to any one of [1] to [8], wherein
the surface modification component (B) further contains 10 to 2,000 parts by weight of a volatile organic solvent (b3) free of a fluorine atoms per 100 parts by weight of the component (b1).

[10]

The fluorine-containing curable composition according to any one of [1] to [9], wherein the curable component (A) contains at least one compound selected from compounds having a hydroxyl group, a carboxyl group, an amino group, an epoxy group, a mercapto group, an isocyanate group, a hydrolyzable silyl group, a silanol group or a carboxylic anhydride group, and is reacted and cured by heat or moisture.

[11]

The fluorine-containing curable composition according to any one of [1] to [10], wherein the curable component (A) contains a hydrolyzable silane compound, a hydrolyzable siloxane compound or a silanol group-containing silicone resin which is free of a fluorine atom.

[12]

The fluorine-containing curable composition according to any one of [1] to [11], wherein the curable component (A) contains at least one of tetraalkoxysilane, trialkoxysilane and dialkoxysilane, or a partial hydrolytic condensate thereof, or a hydrolyzed/partially condensed product of the partial hydrolytic condensate.

[13]

The fluorine-containing curable composition according to any one of [1] to [12], wherein the curable component (A) contains a compound free of a fluorine atom which has two or more isocyanate groups per molecule and a compound free of a fluorine atom which has two or more hydroxyl groups per molecule.

[14]

The fluorine-containing curable composition according to any one of [1] to [13], wherein the curable component (A) contains an epoxy compound free of a fluorine atom.

[15]

The fluorine-containing curable composition according to any one of [1] to [14], wherein the water contact angle of a surface of the cured product is 100° or more.

[16]

An article having a cured film of the fluorine-containing curable composition according to any one of [1] to [15] on a surface thereof.

Advantageous Effects of Invention

The fluorine-containing curable composition of the present invention can be applied to a surface of an article without containing a fluorine-containing solvent, and is capable of imparting surface properties derived from a fluoropolyether structure, such as an excellent water/oil-repellent property, anti-fouling property and fingerprint-proof property to a surface of a cured product.

DESCRIPTION OF EMBODIMENTS

Hereinafter, the present invention is described in detail.

The fluorine-containing curable composition of the present invention includes a curable component (A) which is formed into a cured product by heat or moisture, and a surface modification component (B) containing a perfluoropolyether compound (b1) of the general formula (1) described later.

[Component (A)]

The composition and the curing mechanism of the curable component (A) which is one constituent element of the fluorine-containing curable composition of the present invention are not limited, as long as the curable component (A) is formed into a cured product by heat or moisture, and includes components that do not correspond to components (b1) and (b2) described later, the content of a fluorine-containing solvent having a boiling point of 260° C. or lower at normal pressure is less than 1% by weight with respect to the entire curable component (A), and the curable component (A) can be applied or molded in mixture with the component (b1), and enables fixation of the component (b1) to a surface of the cured product, and it is desirable that at least one compound in the component (A) and the component (b1) be fixed by chemical bonding after curing. The compound contained in the component (A) is preferably one that has a functional group reactive with any of an alkoxy group, an alkoxyalkyl group, an alkoxyalkoxy group, an acyloxy group, an alkenyloxy group and a halogen group as a M group of general formula (1) as described later, and is cured by heat or moisture. In addition, when containing a fluorine atom, the curable component (A) is not a volatile component, and therefore it is desirable a functional group reactive with the M be present in one compound of the component (A).

Examples of the functional group in the compound contained in the curable component (A), having a functional group capable of reacting with the M group in the general formula (1) of the component (b1) include a hydrolyzable silyl group, a silanol group, a hydroxyl group, a carboxyl group, an amino group, an epoxy group, a mercapto group, an isocyanate group and a carboxylic anhydride group.

Among these groups, those having any of a hydrolyzable silyl group, a silanol group, a hydroxyl group, an isocyanate group or an epoxy group are particularly preferable. Specific examples of the hydrolyzable group bonded to the silyl group include an alkoxy group, an oxime group, an isopropenoxy group and an acetoxy group.

Further, the compound having a hydrolyzable silyl group (hydrolyzable silane compound or hydrolyzable siloxane compound) contained in the curable component (A) is preferably one that is free of a fluorine atom, and specific examples thereof include tetrachlorosilane, tetraalkoxysilanes such as tetramethoxysilane, tetraethoxysilane and tetrabutoxysilane; alkyltrichlorosilanes such as methyltrichlorosilane, ethyltrichlorosilane, propyltrichlorosilane, butyltrichlorosilane, hexyltrichlorosilane, cyclohexyltrichlorosilane and decyltrichlorosilane; alkyltrialkoxysilanes such as methyltrimethoxysilane, methyltriethoxysilane, methyltriisopropoxysilane, methyltributoxysilane, ethyltrimethoxysilane, ethyltriethoxysilane, propyltrimethoxysilane, butyltrimethoxysilane, hexyltrimethoxysilane, cyclohexyltrimethoxysilane and decyltrimethoxysilane; alkyltrialkenyloxysilanes such as methyltriisopropenoxysilane and ethyltripropenoxysilane; dialkyldichlorosilanes such as dimethyldichlorosilane, diethyldichlorosilane, propylmethyldichlorosilane and hexylmethyldichlorosilane; dialkyldialkoxysilanes such as dimethyldimethoxysilane, dimethyldiethoxysilane, dimethyldiisopropoxysilane, dimethyldibutoxysilane, diethyldimethoxysilane, diethyldiethoxysilane, diethyldiisopropoxysilane, diethyldibutoxysilane, propylmethyldimethoxysilane and hexylmethyldimethoxysilane; dialkyldialkenyloxysilanes such as dimethyldiisopropenoxysilane and diethyldiisopropenoxysilane; trialkylchlorosilanes such as trimethylchlorosilane and triethylchlorosilane; trialkylalkoxysilanes such as trimethylmethoxysilane, trimethylethoxysilane, trimethylisopropoxysilane, trimethylbutoxysilan, triethylmethoxysilane, triethylethoxysilane, triethylisopropenoxysilane and triethylbutoxysilane; trialkylalkenyloxysilanes such as trimethylisopropenoxysilane and triethylisopropenoxysilane; aryltrichlorosilanes such as phenyltrichlorosilane; aryltrialkoxysilanes such as phenyltrimethoxysilane; alkylaryldichlorosilanes such as phenylmethyldichlorosilane; alkylaryldialkoxysilanes such as phenylmethyldimethoxysilane; diaryldichlorosilanes such as diphenyldichlorosilane; diaryldialkoxysilanes such as diphenyldimethoxysilane; dialkylphenylchlorosilanes such as dimethylphenylchlorosilane, dialkylphenyldialkoxysilanes such as dimethylphenyldimethoxysilane; and partial (co) hydrolytic condensates of one or more of these hydrolyzable silane compounds (e.g. 1,3-dimethyl -1,1,3,3-tetramethoxy disiloxane, 1,3-dimethoxy-1,1,3,3-tetramethyldisiloxane, 1,5-dimethyl -1,1,3,3,5,5-hexamethoxytrisiloxane, 1,5-dimethoxy-1,1,3,3,5,5-hexamethyltrisiloxane, 1,3,5-trimethyl-1,3,5-trimethoxytrisiloxane).

In addition, hydrolyzable silane compounds having a reactive functional group may be used such as vinyltrichlorosilane, vinyltrimethoxysilane, vinyltriethoxysilane, vinylmethyldichlorosilane, vinylmethyldimethoxysilane, vinylmethyldiethoxysilane, 5-hexenyltrimethoxysilane, 3-glycidoxypropyltrimethoxysilane, 3-glycidoxypropyltriethoxysilane, 3-glycidoxypropylmethyldimethoxysilane, 3-glycidoxypropylmethyldiethoxysilane, 3-(meth)acryloxypropyltrimethoxysilane, 3-(meth)acryloxypropyltriethoxysilane, 3-(meth)acryloxypropylmethyldimethoxysilane, 3-(meth)acryloxypropylmethyldiethoxysilane, 4-vinylphenyltrimethoxysilane, 3-(4-vinylphenyl)propyltrimethoxysilane, 4-vinylphenylmethyltrimethoxysilane, 3-aminopropyltrimethoxysilane, 3-aminopropyltriethoxysilane, 3-aminopropylmethyldimethoxysilane, 3-aminopropylmethyldiethoxysilane, 3-(2-aminoethyl)aminopropyltrimethoxysilane, 3-mercaptopropyltrimethoxysilane, 3-mercaptopropyltriethoxysilane, 3-mercaptopropylmethyldimethoxysilane and 3-mercaptopropylmethyldiethoxysilane. In addition, examples thereof include hydrolytic condensates of the above-mentioned compounds, and general-purpose resins such as silicone resins, acrylic resins, polyester resins and epoxy resins obtained from the above-mentioned compounds. These compounds can be used alone or in combination of two or more thereof.

Among these compounds, those containing at least one of tetraalkoxysilane, trialkoxysilane and dialkoxysilane or a partial hydrolytic condensate thereof are preferable, and in particular, it is more preferable to use a silicone resin including a methoxy group-containing silane or an ethoxy group-containing silane and a partial hydrolytic condensate thereof.

As a method for obtaining a silicone resin usable in the present invention by (partially) hydrolyzing and condensing the hydrolyzable silane compound, a silicone resin containing a hydrolyzable silyl group and/or a silanol group can be obtained by (partially) hydrolyzing and condensing the hydrolyzable silane compound in an organic solvent selected from aromatic hydrocarbons such as toluene and xylene, hydrocarbons such as hexane and octane, ketone-based compounds such as methyl ethyl ketone and methyl isobutyl ketone, ester-based compounds such as ethyl acetate and isobutyl acetate, and alcohols such as methanol, ethanol, isopropanol, butanol, isobutanol and t-butanol.

Here, when during hydrolysis, the addition amount of water used is smaller than an amount required for hydrolyzing all of the alkoxy groups of the raw material, the finally obtained silicone resin after condensation contains a large amount of methoxy groups or ethoxy groups which are hydrolyzable silyl groups.

In addition, when for hydrolyzing all of the alkoxy groups of the obtained silicone resin, water is added to the silicone resin in an amount larger than the necessary amount, a silicone resin containing a silanol group as described later can be obtained.

A hydrolysis catalyst may be used in performing hydrolysis and the condensation. As the hydrolysis catalyst, a heretofore known catalyst can be used, and it is preferable to use a catalyst whose aqueous solution is acidic and has a pH of 2 to 7. In particular, acidic hydrogen halides, carboxylic acids, sulfonic acids, acidic or weakly acidic inorganic salts, solid acids such as ion exchange resins, and the like are preferable. Examples thereof include hydrogen fluoride, hydrochloric acid, nitric acid, sulfuric acid, and organic carboxylic acids typified by acetic acid and maleic acid, methyl sulfonic acid (another name:

methanesulfonic acid), and cation exchange resins having a sulfonic acid group or a carboxylic acid group on surfaces thereof. The amount of the hydrolysis catalyst is preferably in the range of 0.001 to 10 mol per 1 mol of the hydrolyzable group on the silicon atom. The reaction temperature is typically 0 to 120° C., and the reaction time may be a time sufficient for the reaction to proceed, and is typically about 30 minutes to 24 hours.

The silicone resin can also be prepared as a solution in which the silicone resin is homogeneously dissolved in the solvent. Here, the concentration of the silicone resin in the solution is not particularly limited as long as a homogeneous solution can be obtained, and the concentration is preferably about 5 to 100% by weight, more preferably about 20 to 60% by weight.

When a compound having a hydrolyzable silyl group (hydrolyzable silane compound) is used in the curable component (A) for use in the present invention, it is also possible to use a curing catalyst for performing curing, or a leveling agent for the purpose of improving film formability. As the curing catalyst, heretofore known various materials such as a hydrosilylation catalyst such as chloroplatinic acid, UV curing agents and the like can be applied in addition to inorganic acids or organic acids, amine compounds or alkali substances, and organometallic compounds such as organotin compounds, organotitanium compounds described later, and organoaluminum compounds. As the leveling agent, polyether-modified oil, fluorine-containing surfactants and the like can be used. The addition amount of the catalyst is typically 0.1 to 15% by weight, preferably 1 to 12% by weight of the compound having a hydrolyzable silyl group.

As the compound having a silanol group contained in the curable component (A) for use in the present invention, a compound having two or more silanol groups per molecule is preferable. Examples of the compound include compounds obtained by hydrolyzing some or all of the hydrolyzable groups of any of the above-described compounds having a hydrolyzable silyl group (hydrolyzable silane compound or hydrolyzable siloxane compound), and (co) hydrolyzed/partially condensed products of one or more of the compounds having a hydrolyzable silyl group (hydrolyzable silane compounds or hydrolyzable siloxane compounds) (i.e. organopolysiloxane resins (silicone resins) having residual silanol groups in a molecule produced by partially condensing some of the silanol groups of the one or more hydrolyzed compounds). Among these compounds, silicone resins containing a silanol group obtained by co-hydrolzing/partially condensing a partial hydrolytic condensate of methyltrimethoxysilane or methyltriethoxysilane (e.g. 1,3-dimethyl-1,1,3,3-tetramethoxydisiloxane or 1,3-dimethyl-1,1,3,3-tetraethoxydisiloxane) with dimethyldimethoxysilane or dimethyldiethoxysilane are preferable.

As the compound having a hydroxyl group contained in the curable component (A) for use in the present invention, a compound having two or more hydroxyl groups per molecule is preferable. Examples of the compound include ethylene glycol, 1,2-propanediol, 1,3-propanediol, 1,2-butanediol, 1,3-butanediol, 1,4-butanediol, 2-methyl-1,3-propanediol, 3-methyl-1,5-pentanediol, 1,6-hexanediol, triethylene glycol, tetraethylene glycol, polyethylene glycol, dipropylene glycol, tripropylene glycol, polypropylene glycol, polyoxyethylene/oxypropylene copolymer glycol, long-chain polyether polyols such as polytetramethylene ether glycol, glycerin, trimethylolpropane, pentaerythritol, sorbitol, sucrose, polyether polyols such as polypropylene glycol and polyethylene glycol, polyoxypropylene triols obtained by addition polymerization of propylene with glycerin, polyester polyols capable of being synthesized by condensation of polyvalent a carboxylic acid and a polyhydric alcohol, polycarbonate polyols, polycaprolactone polyols, bisphenol A, adducts of ethylene oxide and/or propylene oxide with an amine compound such as ethylene diamine, etc., polytetramethylene ether glycol, polymers of an acrylic acid ester derivative having a hydroxyl group, copolymers of an acrylic acid ester and/or methacrylic acid ester derivative having no hydroxyl group and an acrylic acid ester derivative and/or methacrylic acid ester derivative having a hydroxyl group, for example, random copolymers of methyl methacrylate (MMA) and 2-hydroxy-ethyl methacrylate (HEMA). Among these compounds, polyether polyol, polyoxypropylene triol and polyester polyol are preferable.

As the compound having a carboxyl group contained in the curable component (A) for use in the present invention, a compound having two or more carboxyl groups per molecule is preferable. Examples of the compound include aliphatic dicarboxylic acids such as oxalic acid, malonic acid, succinic acid, glutaric acid, adipic acid, pimelic acid, suberic acid, azelaic acid, sebacic acid, dodecanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, hydrogenated dimer acid and dimer acid; aromatic dicarboxylic acids such as phthalic acid, terephthalic acid, isophthalic acid and naphthalenedicarboxylic acid; alicyclic dicarboxylic acids such as cyclohexanedicarboxylic acid; tricarboxylic acids such as trimellitic acid, trimesic acid, and trimers of castor oil a fatty acid; and carboxylic acids with a valence of 4 or more such as pyromellitic acid. Among these compounds, aliphatic dicarboxylic acids are preferable.

As the compound having an amino group contained in the curable component (A) for use in the present invention, a compound having two or more amino groups per molecule is preferable. Examples of the compound include ethylenediamine, hexamethylenediamine, diethylenetriamine, triethylenetriamine, tetraethylenepentamine, phenylenediamine, pentamethylenehexamine, hexamethyleneheptamine, hydrazine, phenylhydrazine and polyethyleneimine.

As the compound having an epoxy group contained in the curable component (A) for use in the present invention, a compound having two or more epoxy groups per molecule is preferable. In particular, non-fluorinated epoxy compounds are preferable. Examples of the compound include ethylene glycol diglycidyl ether, diethylene glycol diglycidyl ether, polyethylene glycol diglycidyl ether, propylene glycol diglycidyl ether, dipropylene glycol diglycidyl ether, tripropylene glycol diglycidyl ether, polypropylene glycol diglycidyl ether, neopentyl glycol diglycidyl ether, 1,6-hexanediol diglycidyl ether, glycerin triglycidyl ether, trimethylolpropane triglycidyl ether, pentaerythritol tetraglycidyl ether, 1,2-cyclohexanedicarboxylic acid diglycidyl, and hydrogenated and non-hydrogenated aromatic glycidyl ether-type epoxy resins (e.g. diglycidyl ether-type derivatives of various bisphenol derivatives such as bisphenol A and bisphenol F, novolac type).

As the compound having a mercapto group contained in the curable component (A) for use in the present invention, a compound having two or more mercapto groups per molecule is preferable. Examples of the compound include 1,4-butanedithiol, 1,5-pentanedithiol, 1,6-hexanedithiol, 1,8-octanedithiol, 1,10-decanedithiol, 1,4-butanediol-bis (thioglycolate), trimethylolpropane-tris(3-mercaptopropionate), trimethylolpropane-tris(thioglycolate), pentaerythritol tetrakis(mercaptoacetate), pentaerythritol-tetrakis(3-mercaptobutyrate), trimethylolpropane-tris(3-mercaptobutyrate) and trimethylolethane-tris(3-mercaptobutyrate). Among these compounds, those having three or more mercapto groups are preferable.

As the compound having an isocyanate group contained in the curable component (A) for use in the present invention, a compound having two or more isocyanate groups per molecule is preferable. Examples of the compound include dicyclohexylmethane diisocyanate, 1,6-hexamethylene diisocyanate, isophorone diisocyanate, 1,3-cyclohexylene diisocyanate, 1,4-cyclohexylene diisocyanate, 2,4-tolylene diisocyanate, 2,6-tolylene diisocyanate, 4,4'-diphenylmethane diisocyanate, 2,4'-diphenylmethane diisocyanate and 2,2'-diphenylmethane diisocyanate. Among these compounds, those classified as aliphatic or alicyclic isocyanates are particularly preferable. In particular, combined use of a compound which has two or more isocyanate groups per molecule and is free of a fluorine atom and a compound which has two or more hydroxyl groups per molecule and is free of a fluorine atom is preferable.

Examples of the compound having a carboxylic anhydride group contained in the curable component (A) for use in the present invention include succinic anhydride, phthalic anhydride, trimellitic anhydride, pyromellitic anhydride, benzophenonetetracarboxylic anhydride, ethylene glycol bistrimelitate, glycerol tristrimelitate, maleic anhydride, tetrahydrophthalic anhydride, endomethylenetetrahydrophthalic anhydride, methylhimic anhydride, methylbutenyltetrahydrophthalic anhydride, dodecenylsuccinic anhydride, hexahydrophthalic anhydride and methylcyclohexenedicarboxylic anhydride.

The curable component (A) for use in the present invention may contain a curing accelerator such as a catalyst if necessary. In particular, when the curable component (A) contains a compound having a hydrolyzable silyl group, organotitanium esters such as tetrabutoxytitanium, tetra-i-propoxytitanium, dibutoxy-(bis-2,4-pentanedionate)titanium, and di-i-propoxy (bis-2,4-pentanedionate)titanium, organozirconium esters such as tetrabutoxyzirconium, tetra-i-propoxyzirconium, dibutoxy-(bis-2,4-pentanedionate)zirconium and di-i-propoxy-(bis-2,4-pentanedionate)zirconium, alkoxyaluminum compounds such as aluminum triisopropoxide, aluminum chelate compounds such as aluminum acetylacetonate complexes, hydrolyzable derivatives such as Hf, V, Nb, Ta, Mo, W, Fe, Ru, Co, Rh, Ni, Zn, Ga, In, Ge and Sn, and the like can be used. Among these substances, an aluminum acetylacetonate complex is preferable from the viewpoint of achieving both stability and curability.

When the curable component (A) contains a compound having an isocyanate group, basic compounds such as trimethylbenzylammonium hydroxide, tetramethylammonium hydroxide, n-hexylamine, tributylamine, diazabicycloundecene (DBU) and dicyandiamide are used; metal-containing compounds such as tetraisopropyl titanate, tetrabutyl titanate, titanium acetylacetonate, aluminum triisobutoxide, aluminum triisopropoxide, aluminum trisacetylacetonate, aluminum bisethylacetoacetate, monoacetylacetonate, zirconium tetra(acetylacetonate), zirconium tetra butyrate, cobalt octylate, cobalt acetylacetonate, iron acetylacetonate, tin acetylacetonate, dibutyltin octylate, dibutyltin laurate, dioctyltin dilaurate, zinc octylate, zinc benzoate, p-tert-butylbenzoate, zinc laurate and zinc stearate; organotitanium chelate compounds such as diisopropoxybis(ethylacetoacetate)titanium and diisopropoxybis(ethylacetoacetate)titanium; and the like can be used.

When the curable component (A) contains a compound having an isocyanate group, secondary and tertiary amines such as piperidine, N,N-dimethylpiperazine, triethylenediamine, benzyldimethylamine, 2-methylimidazole and 2-ethyl-4-methylimidazole, Lewis acids such as $BF_3$, $ZnCh$, $SnCl_4$, $FeCl_3$ and $AlCl_3$, amine complexes of these Lewis acids, dicyandiamide, and the like can also be used.

When the curable component (A) further contains a compound having an epoxy group, a thermal acid generator or a thermal photoacid generator that generates a cation by heating, etc. can be used as a cationic polymerization initiator.

The compounding amount of any of these curing accelerators in the curable component (A) is may be an effective amount for curing the fluorine-containing curable composition of the present invention, and is not particularly limited.

In the curable component (A) in the present invention, heretofore known additives can be further blended if necessary. Examples of the additives include fillers, dyes and pigments, leveling agents, reactive diluents, non-reactive polymer resins, silane coupling agents, antioxidants, ultraviolet absorbers, light stabilizers, antifoaming agents, dispersants, antistatic agents and thixotropy imparting agents.

Further, if necessary, the curable component (A) for use in the present invention may contain a solvent other than the fluorine-containing solvent having a boiling point of 260° C. or lower at normal pressure. Examples of the preferred solvent include alcohols such as 1-propanol, 2-propanol, isopropyl alcohol, n-butanol, isobutanol, tert-butanol and diacetone alcohol; ketones such as methyl propyl ketone, diethyl ketone, methyl ethyl ketone, methyl isobutyl ketone and cyclohexanone; ethers such as dipropyl ether, dibutyl ether, anisole, dioxane, tetrahydrofuran, ethylene glycol monoethyl ether, ethylene glycol monobutyl ether, propylene glycol monomethyl ether and propylene glycol monomethyl ether acetate; esters such as propyl acetate, butyl acetate and cyclohexyl acetate; and aromatics such as toluene, xylene, triethylbenzene and alkylbenzenes. These solvents may be used alone or used in combination of two or more thereof.

The compounding amount of the solvent is not particularly limited, and the total amount of the solvent is preferably 20 to 10,000 parts by weight, and particularly preferably 50 to 1,000 parts by weight per a total of 100 parts by weight of the components other than the solvent contained in the component (A).

Further, as an embodiment of the present invention, a coating material containing a urethane resin, an epoxy resin, a melamine resin, a silicone resin, or a mixture thereof, or a thermosetting hard coat agent can be used as the component (A), with the surface modification component (B) added thereto. That is, an existing curable composition released by a relevant company or having a composition shown in any of various documents such as published patent documents is used as the component (A) or a component in the component (A), and the component (B) is added in an appropriate amount based on an amount of the curable composition (curable component) excluding volatile components, whereby the fluorine-containing curable composition of the present invention and a cured product obtained. As such an existing curable composition, in particular, one marketed as a thermosetting or moisture-curable resin, coating material or hard coat agent, which is commercially available as a urethane resin composition, an epoxy resin composition, a melamine resin composition, an alkyd resin composition or a silicone resin composition, can be used.

As commercially available hydrolyzable silyl group-containing or silanol group-containing compound corresponding to the component (A), for example, KR series and X-40 series from Shin-Etsu Chemical Co., Ltd., Thermal Cure Type of SilFORT series from Momentive Performance Materials Company, and SILRES series from Wacker Company can be exemplified.

Even when a commercially available curable composition is used as the component (A) as described above, known resin additives such as an organic solvent, a polymerization inhibitor, an antistatic agent, an antifoaming agent, a viscosity modifier, a light stabilizer, a heat stabilizer, an antioxidant, a surfactant, a colorant, a leveling agent and a filler, and organic/inorganic compounds having various functional groups can be added and blended depending on a purpose.

[Component (B)]

The surface modification component (B) according to the present invention contains a perfluoropolyether compound (b1), and the perfluoropolyether compound (b1) is represented by the following general formula (1).

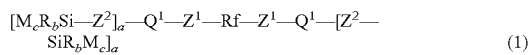
(1)

Here, in the above formula (1), Rf is a divalent perfluoropolyether group having a numerical average molecular weight of 1,500 to 20,000, and as long as the numerical average molecular weight falls within this range, compounds having a larger or smaller molecular weight may be contained. In the present invention, the numerical average molecular weight can be determined by calculation from a ratio between an end structure and a repeating unit structure which are obtained from a $^{19}$F-NMR spectrum (the same applies hereinafter).

In the above formula, Rf is a divalent perfluoropolyether group which is composed of a perfluoroalkylene group having 1 to 6 carbon atoms and an oxygen atom and which has a molecular weight of 1,500 to 20,000, preferably 2,000 to 18,000, more preferably 3,000 to 10,000, specifically Rf is a divalent perfluoropolyether group composed of a repeating unit having one or more of the following structures and a perfluoroalkylene group having 1 to 6 carbon atoms.

—CF$_2$O—
—CF$_2$CF$_2$O—
—CF$_2$CF$_2$CF$_2$O—
—CF(CF$_3$)CF$_2$O—
—CF$_2$CF$_2$CF$_2$CF$_2$O—
—CF$_2$CF$_2$CF$_2$CF$_2$CF$_2$O—
—CF$_2$CF$_2$CF$_2$CF$_2$CF$_2$CF$_2$O—

Those having any of the following perfluorooxyalkylene structures having 1 to 4 carbon atoms as a main repeating unit are particularly suitable.

—CF$_2$O—
—CF$_2$CF$_2$O—
—CF(CF$_3$)CF$_2$O—
—CF$_2$CF$_2$CF$_2$O—
—CF$_2$CF$_2$CF$_2$CF$_2$O—

As the perfluoroalkylene group having 1 to 6 carbon atoms, those shown below can be exemplified.

—CF$_2$—
—CF$_2$CF$_2$—
—CF(CF$_3$)—
—CF$_2$CF$_2$CF$_2$—
—CF(CF$_3$)CF$_2$—
—CF$_2$CF$_2$CF$_2$CF$_2$—

Examples of the particularly preferred structure of Rf include the following four structures.

—CF$_2$O(CF$_2$O)$_p$(CF$_2$CF$_2$O)$_q$CF$_2$—
—CF$_2$CF$_2$O(CF$_2$O)$_p$(CF$_2$CF$_2$O)$_q$CF$_2$CF$_2$—

(wherein p is an integer of 10 to 290, preferably 15 to 90, more preferably 20 to 60, q is an integer of 5 to 170, preferably 10 to 120, more preferably 15 to 50, p+q is an integer of 15 to 295, preferably 20 to 210, more preferably 30 to 100, and the combination of p and q is in a range which ensures that the numerical average molecular weight of Rf as the whole component (b1) of the surface modification component (B) is 1,500 to 20,000; and the sequence of the repeating units of —CF$_2$O— and —CF$_2$CF$_2$O— is random.)

—CF(CF$_3$)[OCF$_2$CF(CF$_3$)]$_s$O(C$_u$F$_{2u}$O)$_v$[CF(CF$_3$)CF$_2$O]$_t$CF(CF$_3$)—
—CF$_2$CF$_2$CF$_2$O[CF(CF$_3$)CF$_2$O]$_t$CF$_2$CF$_2$—

(wherein each of a and t is an integer of 1 to 120, preferably 2 to 60, more preferably 4 to 20, s+1 is an integer of 4 to 121, preferably 4 to 100, more preferably 8 to 80, u is an integer of 1 to 6, preferably 2 to 4, and v is 0 to 10, preferably 0 to 4; and the combination of s, t, u and v is in a range which ensures that the numerical average molecular weight of Rf as the whole component (b1) of the surface modification component (B) is 1,500 to 20,000.)

In the above formula (1), each $Z^1$ is independently a divalent linking group, and optionally contains an oxygen atom, a nitrogen atom, a fluorine atom or a silicon atom, and may be a group having a cyclic structure and/or an unsaturated bond. Specific examples of such a structure include the following structures. In the following structure, it is preferable that the left dangling bond is bonded to Rf and the right bond is bonded to a silicon atom in $Q^1$.

—CH$_2$CH$_2$—  —CH$_2$CH$_2$CH$_2$—
—CH$_2$CH$_2$CH$_2$CH$_2$—  —CH$_2$OCH$_2$CH$_2$—
—CH$_2$OCH$_2$CH$_2$CH$_2$—

[Chem. 2]

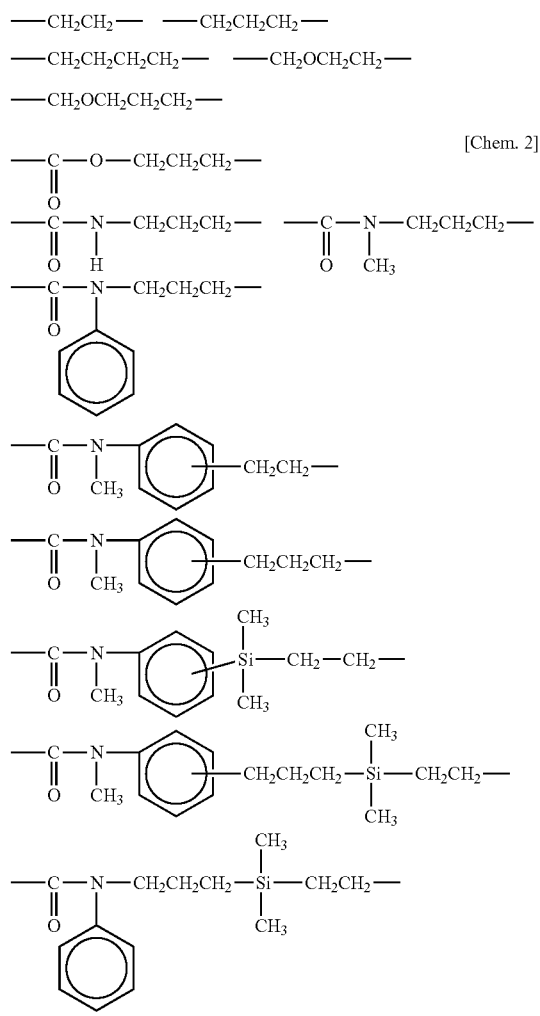

In the above formula (1), each $Z^2$ is independently a divalent hydrocarbon group having 2 to 20 carbon atoms, and may have a cyclic structure or may contain an intermediate ether bond (—O—).

Specific examples thereof include groups of the following formulae. In the following structure, it is preferable that the left dangling bond is bonded to a silicon atom in $Q^1$ and the right dangling bond is bonded to a silicon atom bonded to R or M.

—(CH$_2$)$_w$—

—CH$_2$CH$_2$CH$_2$OCH$_2$CH$_2$CH$_2$—

—CH$_2$CH$_2$CH$_2$OCH$_2$CH$_2$OCH$_2$CH$_2$CH$_2$—

—CH$_2$CH$_2$CH$_2$OCH$_2$CH$_2$OCH$_2$CH$_2$OCH$_2$CH$_2$CH$_2$—

[Chem. 3]

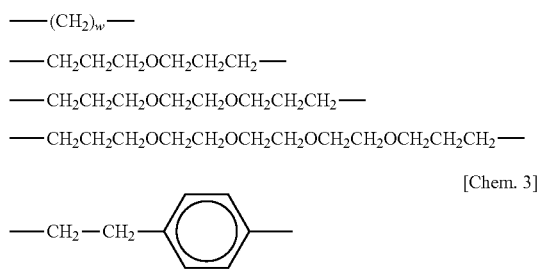

(wherein w is an integer of 2 to 20.)

$Z^2$ is particularly preferably
—(CH$_2$)$_w$—,
more preferably one in which w is an integer of 3 to 12 in the above formula.

Here, in formula (1), all "a" number of $Z^2$ in the square bracket are bonded to the silicon atom in the $Q^1$ structure.

In the above formula (1), each a is independently an integer of 1 to 10, preferably an integer of 1 to 8, more preferably an integer of 1 to 4.

Each $Q^1$ is independently a linking group with a valence of (a+1), has a structure with two or more of a hydrogen atom, a carbon atom, an oxygen atom, a silicon atom and a nitrogen atom, and may have a ring shape. $Q^1$ is particularly preferably a linking group with a valence of (a+1) which has a siloxane structure with at least (a+1) number of silicon atoms, an unsubstituted or halogen-substituted silalkylene structure, a silarylene structure, or a combination of two or more thereof.

As such $Q^1$, specifically the following structures can be exemplified.

[Chem. 4]

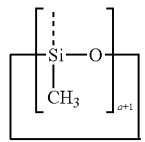

[Chem. 5]

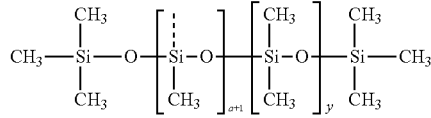

[Chem. 6]

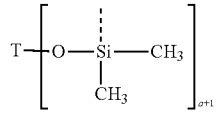

(wherein a dashed-line dangling bond is bonded to $Z^1$ or $Z^2$, and a is the same as a in the above formula (1), and each a is independently an integer of 1 to 10, preferably an integer of 1 to 8, more preferably an integer of 1 to 4; and y is an integer of 0 to 5, preferably an integer of 1 to 3.)

Here, T is a linking group with a valence of (a+1), and examples thereof include the following.

[Chem. 7]

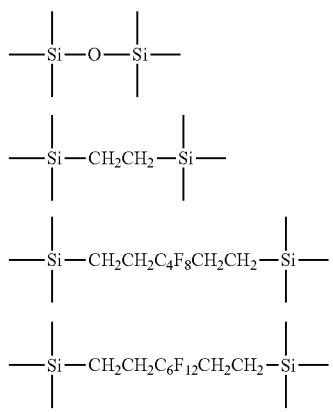

Examples of $Q^1$ include the following structures.

[Chem. 8]

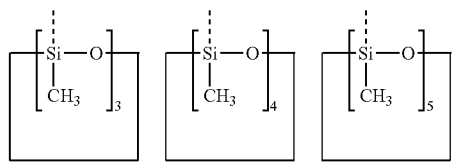

[Chem. 9]

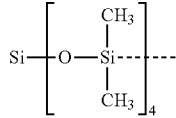

[Chem. 10]

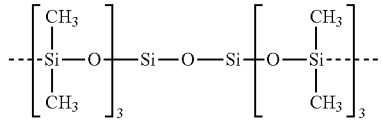

[Chem. 11]

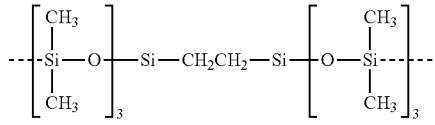

[Chem. 12]

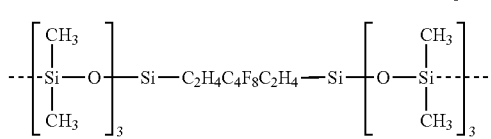

[Chem. 13]

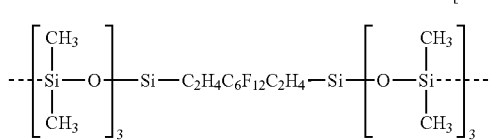

Among $Q^1$s above, cyclic siloxane structures are preferable, and the following structures are particularly preferable.

[Chem. 14]

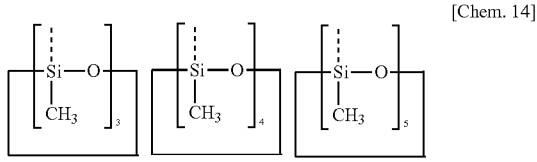

In the above formula (1), each R is independently a monovalent hydrocarbon group having 1 to 6 carbon atoms, preferably 1 to 4 carbon atoms. Specific examples of the monovalent hydrocarbon group include alkyl groups such as a methyl group, an ethyl group, a propyl group, an isopropyl group, a butyl group, an isobutyl group, a tert-butyl group, a pentyl group, a neopentyl group and a hexyl group; cycloalkyl groups such as a cyclohexyl group; alkenyl groups such as a vinyl group, an allyl group and a propenyl group; and phenyl groups, and a methyl group is particularly preferable.

In the above formula (1), each M is independently a group selected from the group consisting of an alkoxy group having 1 to 10 carbon atoms, an alkoxyalkyl group having 2 to 10 carbon atoms, an alkoxyalkoxy group having 2 to 10 carbon atoms, an acyloxy group having 1 to 10 carbon atoms, an alkenyloxy group having 2 to 10 carbon atoms, and a halogen group. Examples of M include alkoxy groups having preferably 1 to 6 carbon atoms, such as a methoxy group, an ethoxy group, a propoxy group and an isopropoxy group; alkoxyalkyl groups having preferably 2 to 4 carbon atoms, such as a methoxymethyl group, a methoxyethyl group, an ethoxymethyl group and an ethoxyethyl group; alkoxyalkoxy groups having preferably 2 to 4 carbon atoms, such as a methoxymethoxy group, a methoxyethoxy group, an ethoxymethoxy group and an ethoxyethoxy group; acyloxy groups having preferably 1 to 7 carbon atoms, such as an acetoxy group; alkenyloxy groups having preferably 2 to 6 carbon atoms, such as an isopropenoxy group; and halogen groups such as a chloro group, a bromo group and an iodo group. Among these groups, a methoxy group, an ethoxy group and a methoxymethyl group are particularly suitable.

In the above formula (1), each b is independently an integer of 0 to 2, preferably 0 or 1, each c is independently an integer of 1 to 3, preferably 2 or 3, and b and c on one silicon atom satisfy b+c=3.

Examples of the generalized structure as the component (b1) include the following structures.

[Chem. 15]

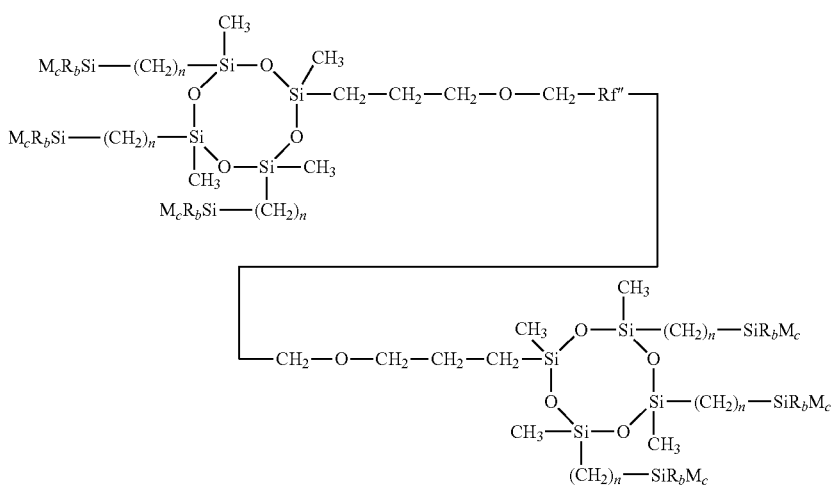

[Chem. 16]

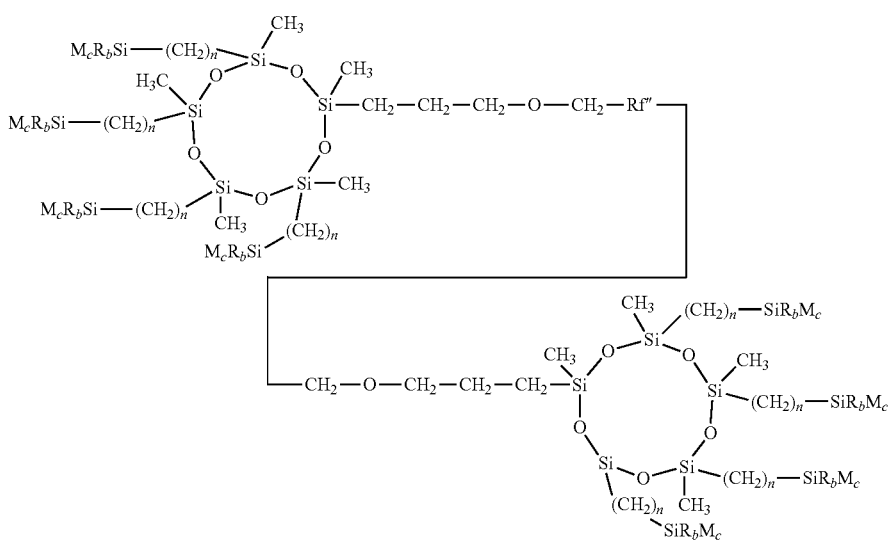

-continued
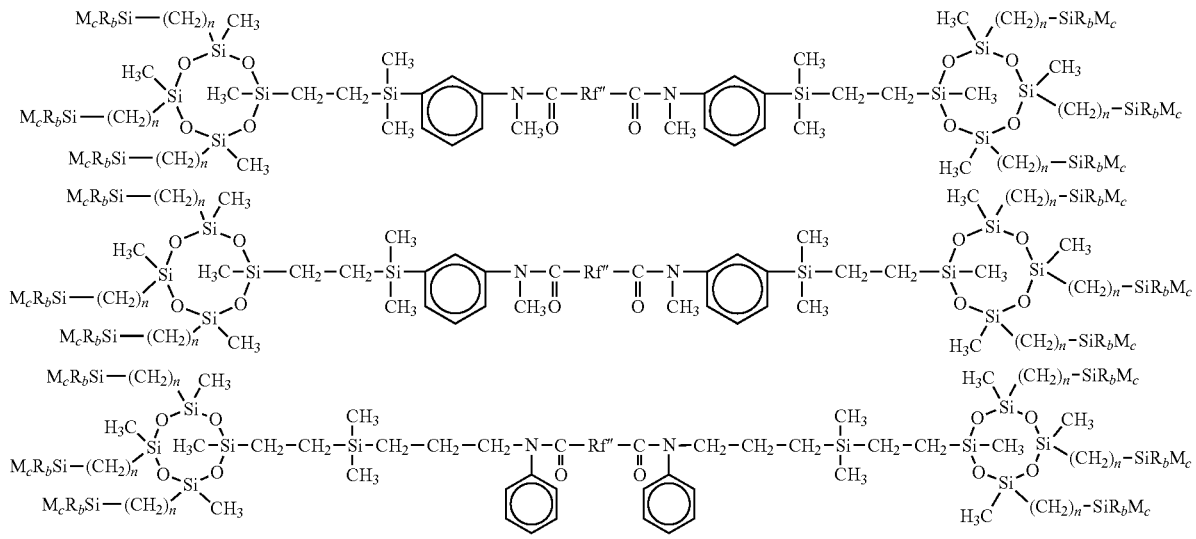
[Chem. 17]
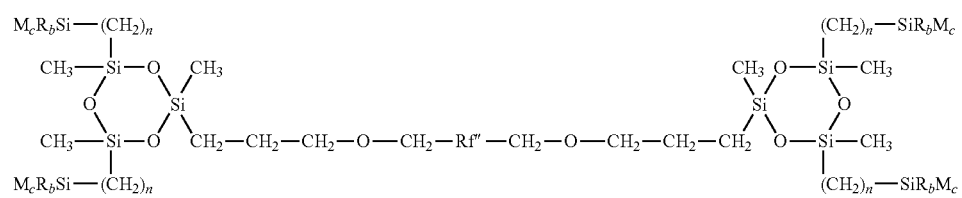
[Chem. 18]
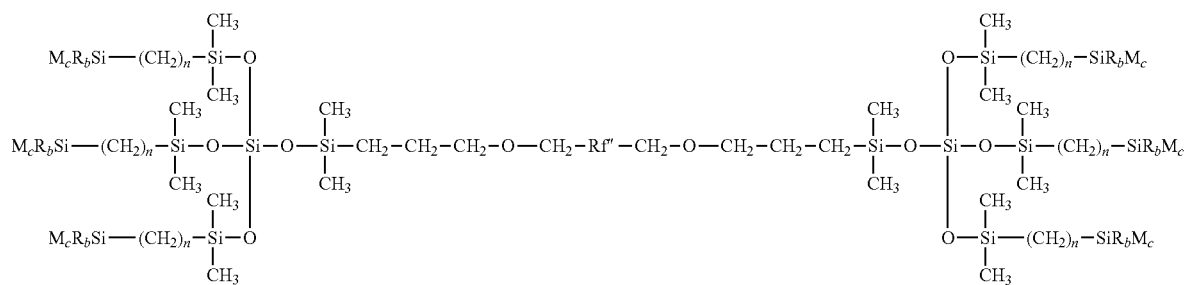
[Chem. 19]
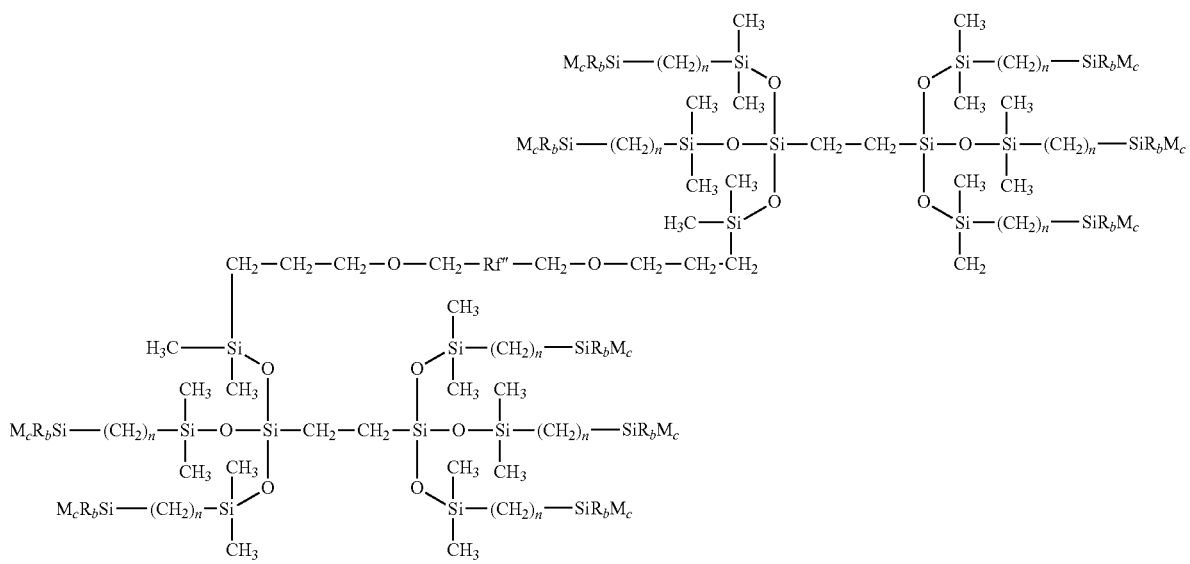
[Chem. 20]

wherein R, M, b, c and b+c are as described above, Rf" is —CF$_2$O(CF$_2$O)$_{p1}$(CF$_2$CF$_2$O)$_{q1}$CF$_2$—, p1 is an integer of 10 to 300, q1 is an integer of 5 to 170, q1+p1 is a number of 15 to 470, and the sequence of the repeating units of —CF$_2$O— and —CF$_2$CF$_2$O— is random; Rf''' is a group of the following formula:

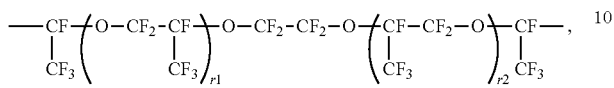

[Chem. 21]

each of r1 and r2 is an integer of 2 to 60, preferably 4 to 20, and r1+r2 is a number of 4 to 120; each n is independently an integer of 2 to 20, preferably 3 to 10.)

Further, particularly desirable structures include the following structures.

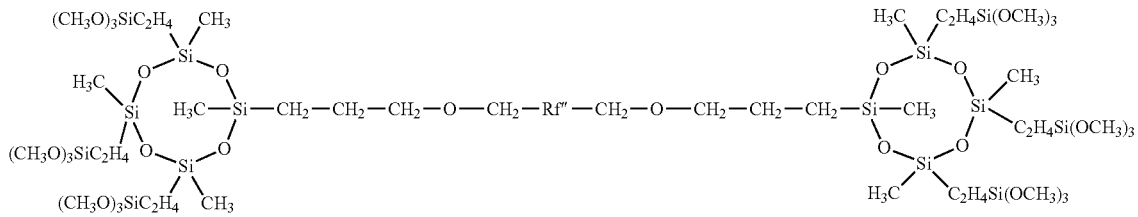

[Chem. 22]

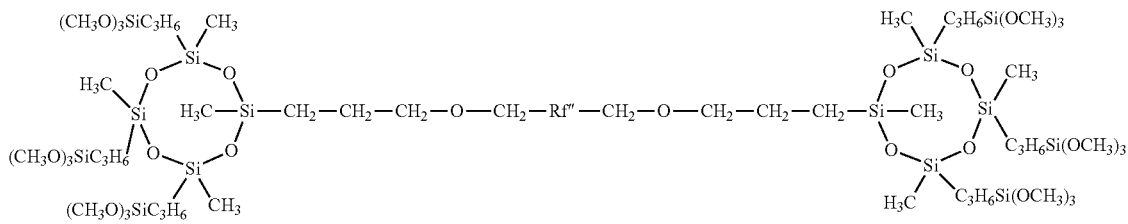

[Chem. 23]

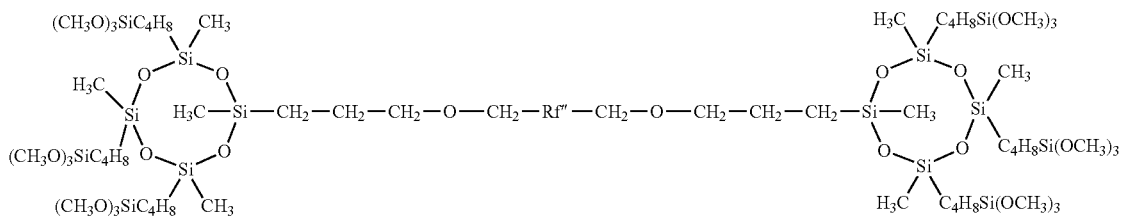

[Chem. 24]

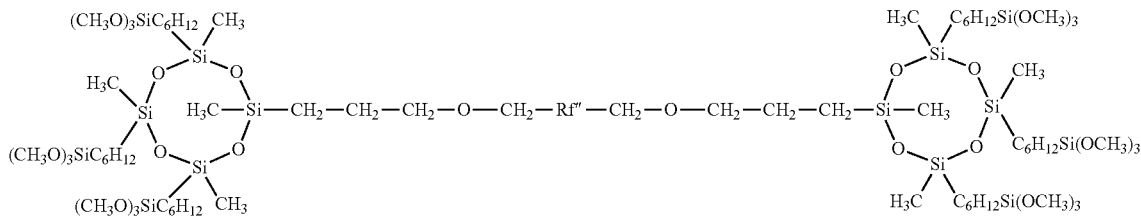

[Chem. 25]

[Chem. 26]

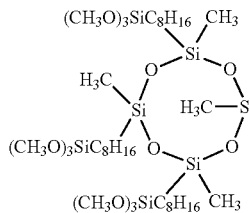 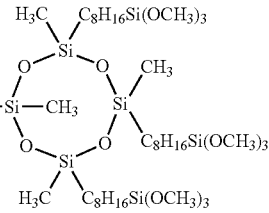

[Chem. 27]

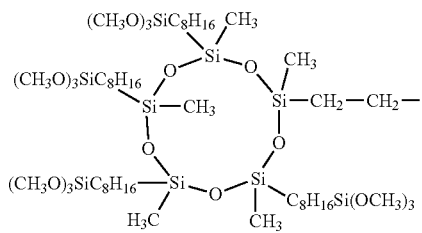 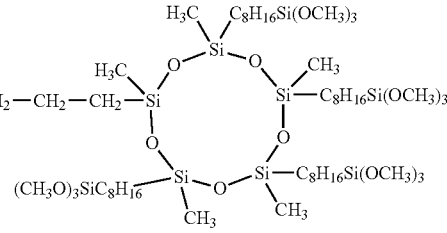

[Chem. 28]

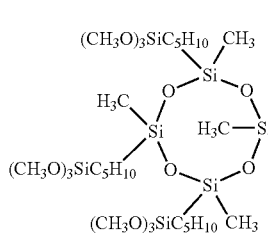 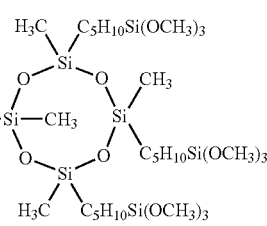

[Chem. 29]

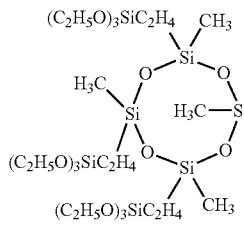 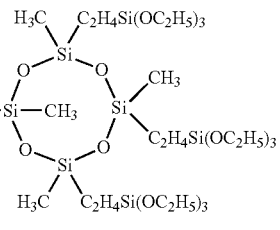

[Chem. 30]

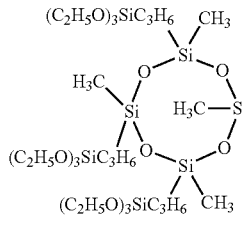 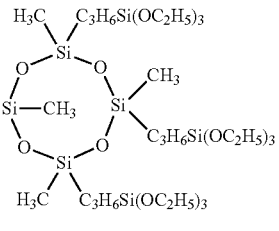

(wherein Rf'' is as described above, and as Rf''', one having a molecular weight of 1,500 to 18,000 is particularly desirable.)

The perfluoropolyether compound (b1) can be obtained by, for example, subjecting a known perfluoropolyether compound of the following general formula (3), which has "2a" number of (polyfunctional) Si-H groups, to an addition reaction with a terminally unsaturated group-containing reactive silane compound of the following general formula (4) by hydrosilylation.

$$[H]_a-Q^1-Z^1-Rf-Z^1-Q^1-[H]_a \quad (3)$$

(wherein Rf, $Z^1$, $Q^1$ and a are as described above.)

$$CH_2=CR^2-(Z^3)_x-SiR_bM_c \quad (4)$$

(wherein R, M, b, c and b +c are as described above, x is 0 or 1, and $Z^3$ is a divalent hydrocarbon group having 1 to 18 carbon atoms, may have a cyclic structure, and optionally contains an intermediate ether bond (—O—); and $R^2$ is a hydrogen atom or a monovalent hydrocarbon group having 1 to 10 carbon atoms, and the total number of carbon atoms in $Z^3$ and $R^2$ is 0 to 18, preferably 1 to 10.)

Here, as the perfluoropolyether compound of the above formula (3) which has a polyfunctional Si—H group, those shown below can be exemplified.

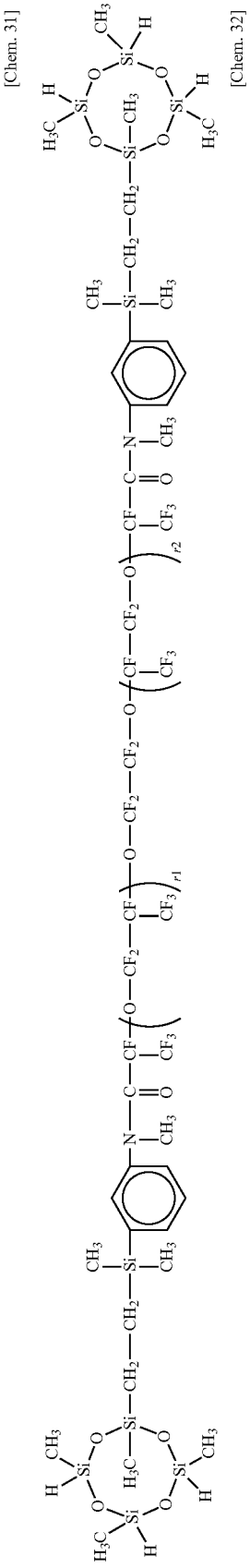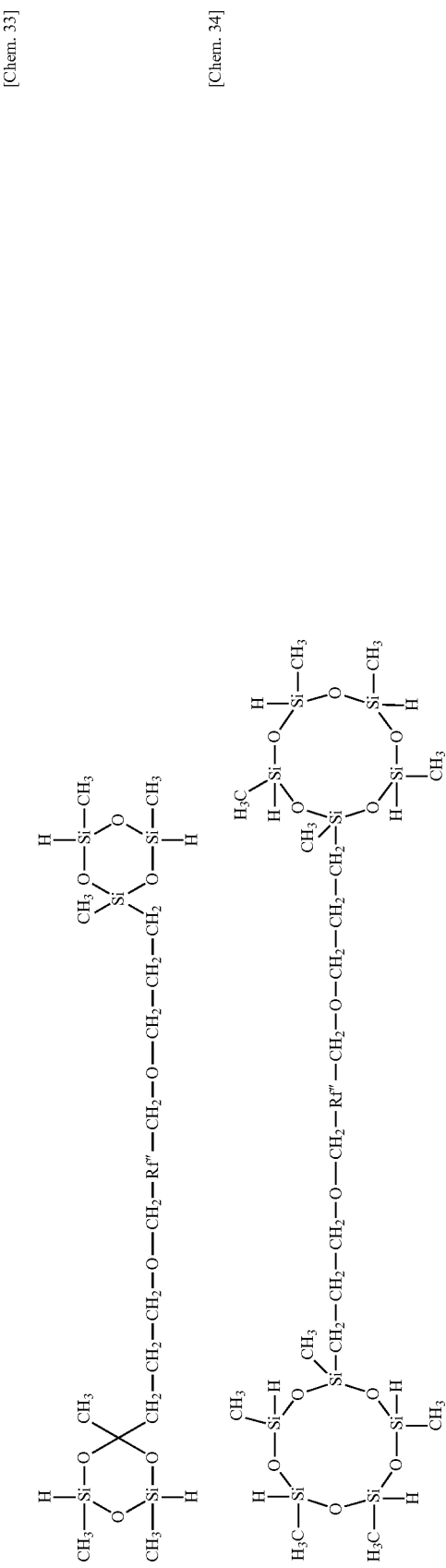

-continued
[Chem. 35]
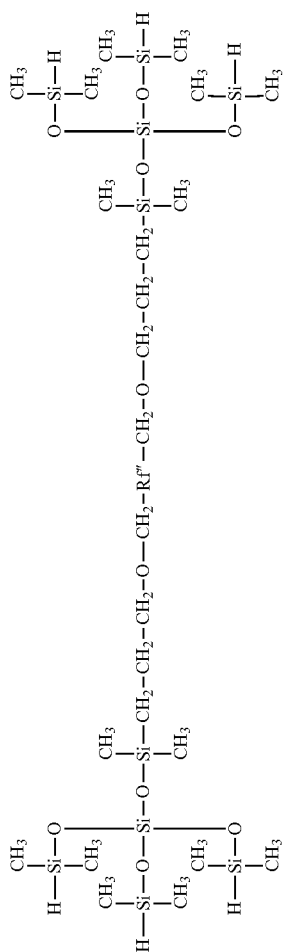
[Chem. 36]
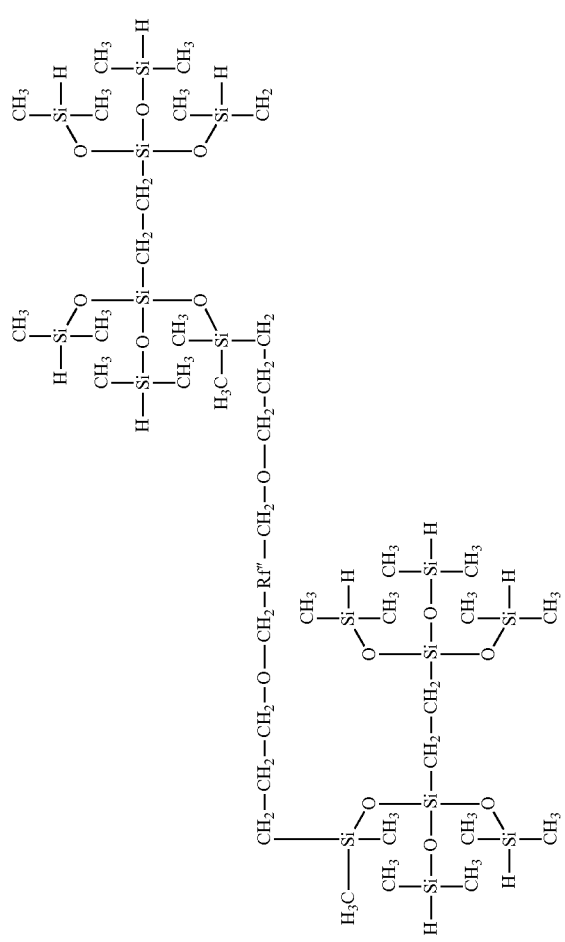

-continued
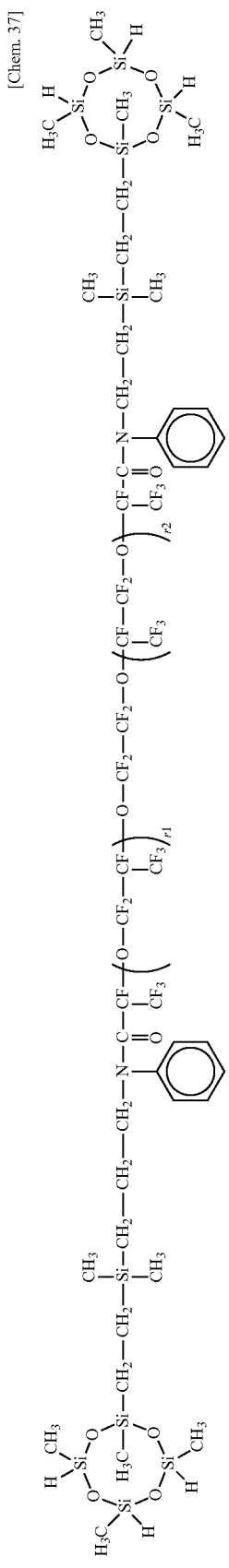
[Chem. 37]
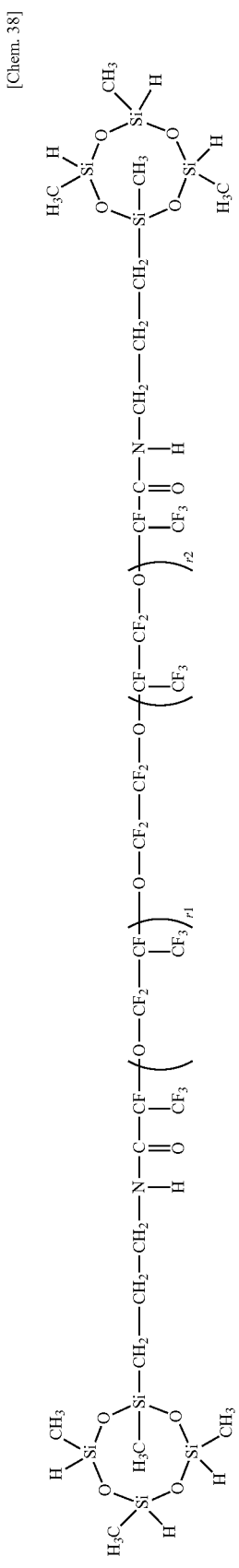
[Chem. 38]
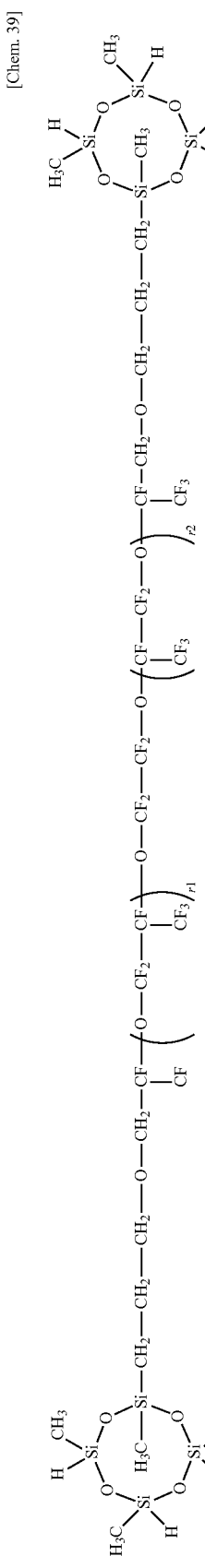
[Chem. 39]
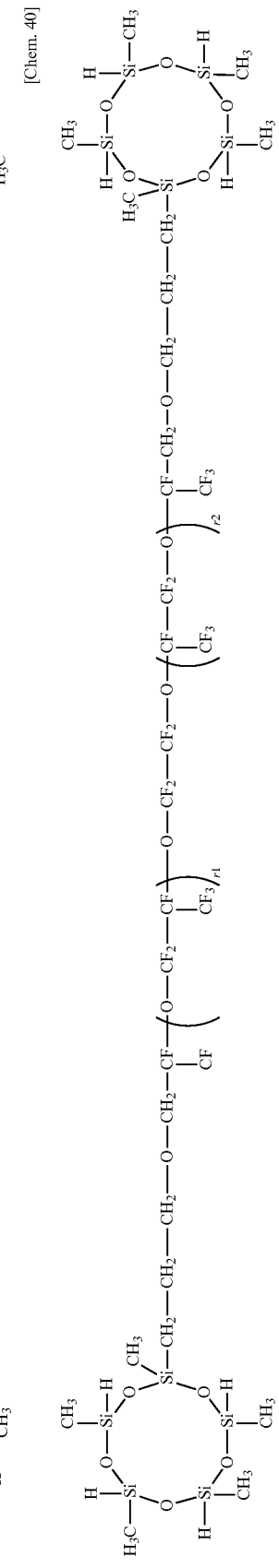
[Chem. 40]

-continued
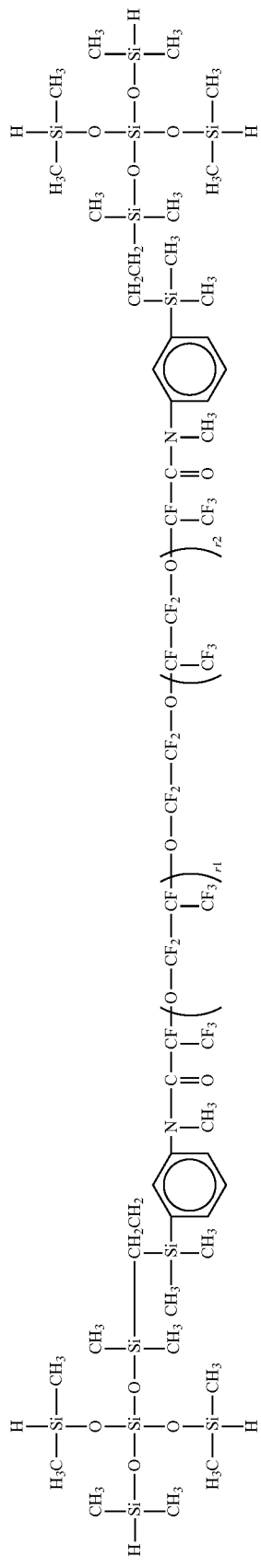
[Chem. 41]
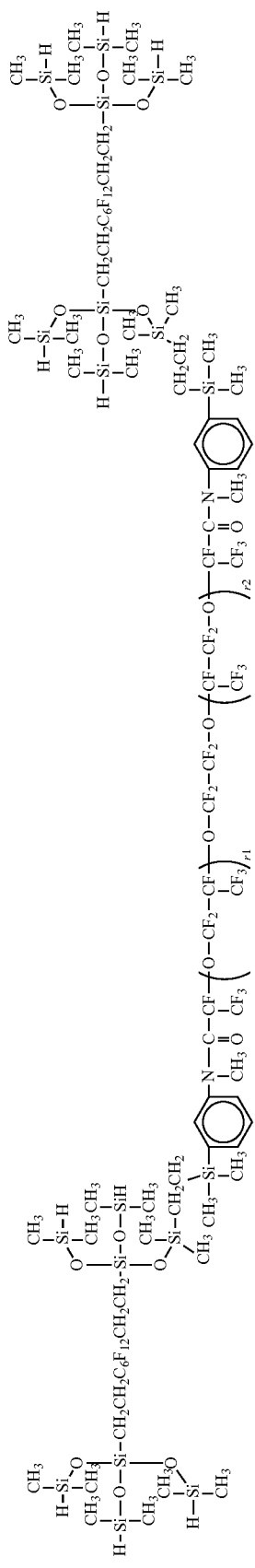
[Chem. 42]
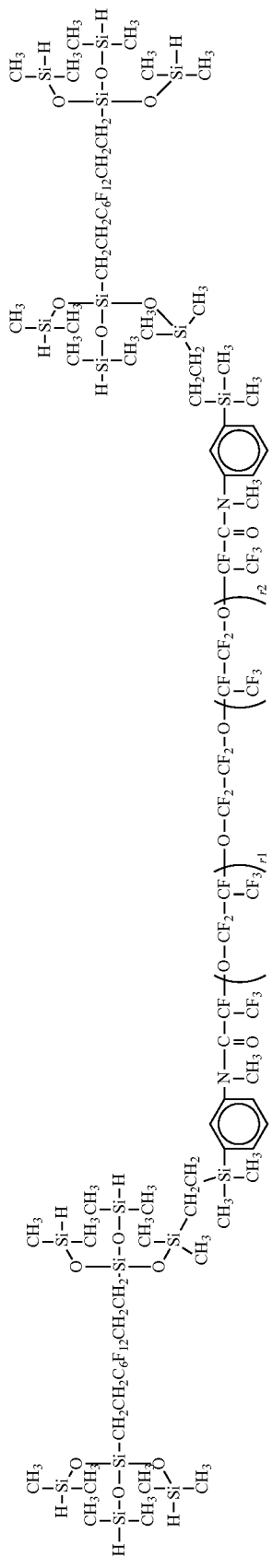
[Chem. 43]
(wherein Rf″, r1, r2 and r1 + r2 are the same as described above.)

Examples of $Z^3$ in the above formula (4) include those of the following formulae. In the following structure, it is preferable that the left dangling bond is bonded to a carbon atom and the right bond is bonded to a silicon atom.

—(CH$_2$)$_{w'}$—

—CH$_2$OCH$_2$CH$_2$CH$_2$—

—CH$_2$OCH$_2$CH$_2$OCH$_2$CH$_2$CH$_2$—

—CH$_2$OCH$_2$CH$_2$OCH$_2$CH$_2$OCH$_2$CH$_2$CH$_2$—

[Chem. 44]

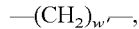

(wherein w' is an integer of 1 to 18.)

$Z^3$ is particularly preferably

—(CH$_2$)$_{w'}$—, more preferably one in which w' is an integer of 1 to 10 in the above formula, particularly preferably one in which w' is an integer of 1 to 6 in the above formula.

Examples of the monovalent hydrocarbon group having 1 to 10 carbon atoms as $R^2$ in the above formula (4) include alkyl groups such as a methyl group, an ethyl group, a propyl group, an isopropyl group, a butyl group, an isobutyl group, a tert-butyl group, a pentyl group, a neopentyl group, a hexyl group and an octyl group; cycloalkyl groups such as a cyclohexyl group; alkenyl groups such as a vinyl group, an allyl group and a propenyl group; and aryl groups such as a phenyl group, and $R^2$ is particularly preferably a hydrogen atom.

Examples of the terminally unsaturated group-containing reactive silane compound of the above formula (4) include the following compounds.

CH$_2$=CHSi(OCH$_3$)$_3$
CH$_2$=CHCH$_2$Si(OCH$_3$)$_3$
CH$_2$=CHCH$_2$CH$_2$Si(OCH$_3$)$_3$
CH$_2$=CHCH$_2$CH$_2$CH$_2$Si(OCH$_3$)$_3$
CH$_2$=CHCH$_2$CH$_2$CH$_2$CH$_2$Si(OCH$_3$)$_3$
CH$_2$=CHCH$_2$CH$_2$CH$_2$CH$_2$CH$_2$CH$_2$Si(OCH$_3$)$_3$
CH$_2$=CHSi(OC$_2$H$_5$)3
CH$_2$=CHCH$_2$Si(OC$_2$H$_5$)$_3$
CH$_2$=CHCH$_2$CH$_2$Si(OC$_2$H$_5$)$_3$
CH$_2$=CHCH$_2$CH$_2$CH$_2$Si(OC$_2$H$_5$)$_3$
CH$_2$=CHCH$_2$CH$_2$CH$_2$CH$_2$CH$_2$Si(OC$_2$H$_5$)$_3$
CH$_2$=CHSi(OC$_3$H$_7$)$_3$
CH$_2$=CHCH$_2$Si(OC$_3$H$_7$)$_3$
CH$_2$=CHCH$_2$CH$_2$Si(OC$_3$H$_7$)$_3$
CH$_2$=CHCH$_2$CH$_2$CH$_2$CH$_2$CH$_2$Si(OC$_3$H$_7$)$_3$
CH$_2$=CHSiCH$_3$(OCH$_3$)$_2$
CH$_2$=CHCH$_2$SiCH$_3$(OCH$_3$)$_2$
CH$_2$=CHCH$_2$CH$_2$CH$_2$CH$_2$SiCH$_3$(OCH$_3$)$_2$
CH$_2$=CHSiCH$_3$(OCH$_2$CH$_3$)$_2$
CH$_2$=CHCH$_2$SiCH$_3$(OCH$_2$CH$_3$)$_2$
CH$_2$=CHCH$_2$CH$_2$SiCH$_3$(OCH$_2$CH$_3$)$_2$
CH$_2$=CHCH$_2$CH$_2$CH$_2$CH$_2$SiCH$_3$(OCH$_2$CH$_3$)$_2$

Among these compounds, the following compounds are particularly preferable.

CH$_2$=CHSi(OCH$_3$)$_3$
CH$_2$=CHCH$_2$Si(OCH$_3$)$_3$
CH$_2$=CHCH$_2$CH$_2$Si(OCH$_3$)$_3$
CH$_2$=CHCH$_2$CH$_2$CH$_2$Si(OCH$_3$)$_3$
CH$_2$=CHCH$_2$CH$_2$CH$_2$CH$_2$Si(OCH$_3$)$_3$
CH$_2$=CHCH$_2$CH$_2$CH$_2$CH$_2$CH$_2$CH$_2$Si(OCH$_3$)$_3$
CH$_2$=CHSi(OC$_2$H$_5$)$_3$
CH$_2$=CHCH$_2$Si(OC$_2$H$_5$)$_3$

It is desirable to carry out the hydrosilylation (addition) reaction such that a perfluoropolyether compound of formula (3) which has a polyfunctional Si—H group is mixed with a terminally unsaturated group-containing reactive silane compound of formula (4), and the mixture is reacted in the presence of a platinum group metal-based addition reaction catalyst at a reaction temperature of 50 to 150° C., preferably 60 to 120° C., for 1 minute to 48 hours, particularly 10 minutes to 12 hours. If the reaction temperature is excessively low, the reaction may be stopped without sufficiently proceeding, and if the reaction temperature is excessively high, reaction heat from hydrosilylation may increase the temperature to the extent that it is impossible to control the reaction, leading to occurrence of bumping or decomposition of raw materials.

Here, it is desirable to set the reaction ratio between a perfluoropolyether compound of formula (3) which has a polyfunctional Si—H group and a terminally unsaturated group-containing reactive silane compound of formula (4) such that the number of moles of terminally unsaturated groups of the terminally unsaturated group-containing reactive silane compound of formula (4) is 0.95 to 5 times, particularly 1 to 2 times the total number of moles of H in the square bracket in the perfluoropolyether compound of formula (3) which has a polyfunctional Si—H group. If the amount of the terminally unsaturated group-containing reactive silane compound of formula (4) is excessively smaller, it may be difficult to obtain a target product. If the amount of the terminally unsaturated group-containing reactive silane compound of formula (4) is excessively larger, the homogeneity of the reaction solution may be deteriorated to the extent that the reaction rate becomes unstable, or it is necessary that conditions of heating, pressure reduction, extraction and the like for removal of an unreacted terminally unsaturated group-containing reactive silane compound of formula (4) after the reaction be tightened as the amount of the terminally unsaturated group-containing reactive silane compound of formula (4) increases.

As the addition reaction catalyst, for example, compounds containing a platinum group metal such as platinum, rhodium or palladium can be used. Among these compounds, compounds containing platinum are preferable, and hexachloroplatinic (IV) acid hexahydrate, a platinum carbonyl vinyl methyl complex, a platinum-divinyltetramethyldisiloxane complex, a platinum-cyclovinylmethylsiloxane complex, a platinum-octylaldehyde/octanol complex, or platinum supported on activated carbon can be used. The compounding amount of the addition reaction catalyst is an amount such that the amount of the contained metal is preferably 0.1 to 5,000 ppm by weight, more preferably 0.2 to 1,000 ppm by weight, with respect to the perfluoropolyether compound of formula (3) which has a polyfunctional Si—H group.

The above-described addition reaction can be carried out without the presence of a solvent, and may be diluted with a solvent if necessary. Here, as the diluent solvent, an organic solvent that is widely and generally used, such as toluene, xylene or isooctane, can be used, and a solvent is preferable which has a boiling point higher than the intended reaction temperature and does not inhibit the reaction and in which the compounds of formulae (3) and (4) used in the reaction are soluble at the reaction temperature. As such a solvent, for example, a partially fluorine-modified solvent such as a fluorine-modified aromatic hydrocarbon-based solvent such as m-xylene hexafluoride or benzotrifluoride, or a fluorine-modified ether-based solvent such as methyl perfluorobutyl ether is desirable, and m-xylene hexafluoride is particularly preferable. When a solvent is used, the amount of the solvent used is preferably 5 to 2,000 parts by weight, more preferably 50 to 500 parts by weight per 100 parts by weight of the perfluoropolyether compound of formula (3) which has a polyfunctional Si—H group.

If the amount of the solvent is less than the above-mentioned amount, the effect of dilution with the solvent may decrease, and if the amount of the solvent is more than the above-mentioned amount, the dilution degree may become excessively high, leading to a decrease in reaction rate.

It is preferable to remove the unreacted compound of formula (4) and the diluent solvent by a known method such as distillation under reduced pressure, extraction, adsorption or the like after completion of the reaction. In particular, when a fluorine-containing solvent having a boiling point of 260° C. or lower at normal pressure, such as m-xylene hexafluoride, benzotrifluoride, methylnonafluorobutyl ether, methylnonafluoroisobutyl ether, ethylnonafluorobutyl ether, ethylnonafluoroisobutyl ether, 3-methoxyperfluoro(3-methylpentane) or 2-(trifluoromethyl)-3-ethoxydodecafluorohexane, is contained, it is preferable to remove the solvent so that the amount of the fluorine-containing solvent is less than 1% by weight with respect to the entire surface modification component (B). Here, the content of the fluorine-containing solvent having a boiling point of 260° C. or lower at normal pressure can be measured by, for example, performing calculation from the result of NMR measurement of an internal standard substance added to the component (B) as necessary, on the basis of a $^{19}$F-NMR spectrum or a $^{1}$H-NMR spectrum of each solvent used in the reaction. The unreacted compound of formula (4) and the volatile solvent containing no fluorine atom can also be used as constituent elements of the component (B).

In addition, as another synthesis route for the component (b 1) in the present invention, the component (b1) can be obtained by reacting a perfluoropolyether compound of the following general formula (5), which has a terminally unsaturated group, with a reactive silane compound of the following general formula (6) which has one Si-H group and at least one hydrolyzable silyl group, as another form of the embodiment of the present invention.

$$Z^4-Rf-Z^4 \quad (5)$$

$$H-Q^1-[Z^2-SiR_bM_c]_a \quad (6)$$

(wherein Rf, $Q^1$, $Z^2$, R, M, a, b, c and b+c are as described above, each $Z^4$ is independently a monovalent hydrocarbon group having one carbon-carbon unsaturated bond capable of addition reaction with a Si-H group at the terminal, having 2 to 20 carbon atoms and optionally containing one or more selected from an oxygen atom, a nitrogen atom a fluorine atom and a silicon atom, and optionally contains an intermediate cyclic structure and/or an unsaturated bond; and Hs and "a" number of $Z^2$ in formula (6) are all bonded to the silicon atom in the $Q^1$ structure.)

Here, specific examples of $Z^4$ in the general formula (5) include the following structures.

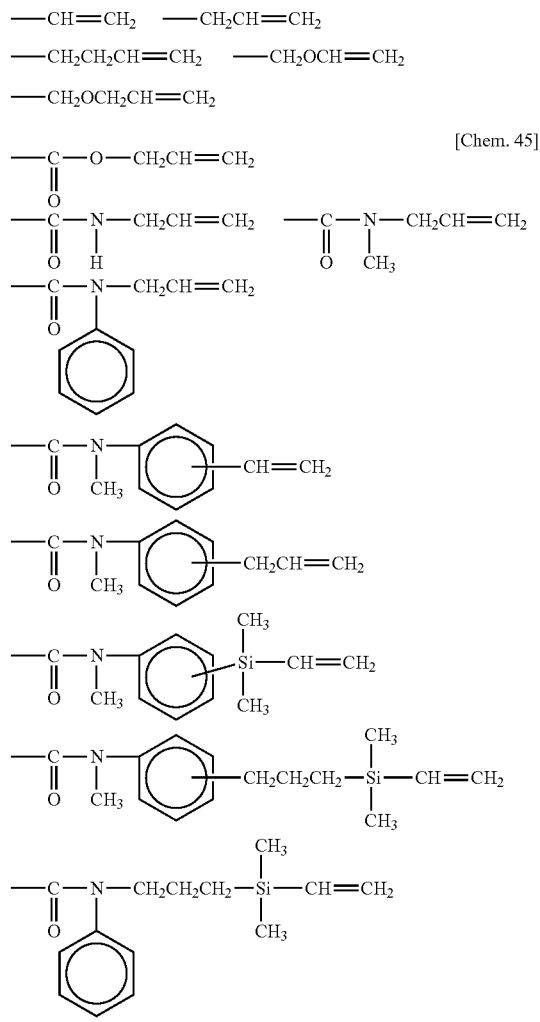

[Chem. 45]

Here, as the perfluoropolyether compound of the above formula (5) which has a terminally unsaturated group, those shown below can be exemplified.

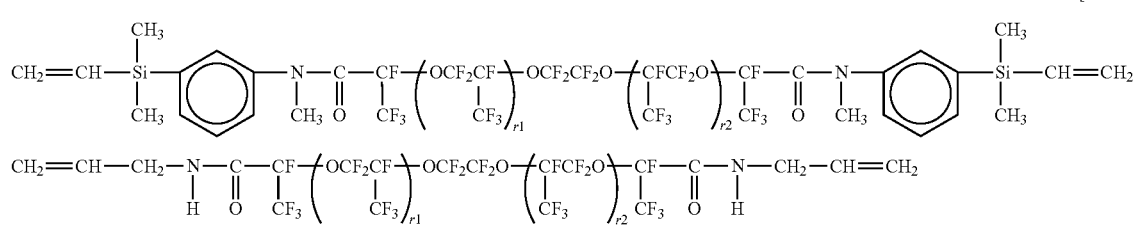

[Chem. 46]

-continued

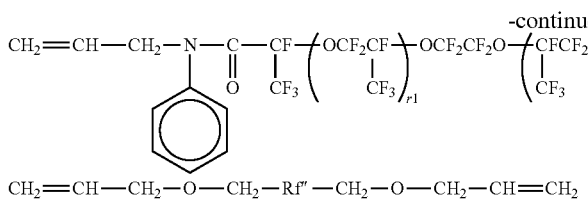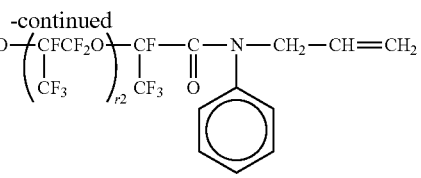

(wherein Rf", r1, r2 and r1 + r2 are as describer above.)

As the reactive silane compound of the above formula (6) which has one Si—H group and at least one hydrolyzable silyl group, those shown below can be exemplified.

[Chem. 47]

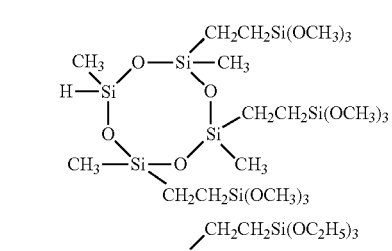

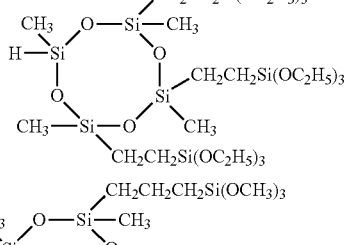

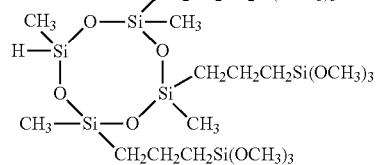

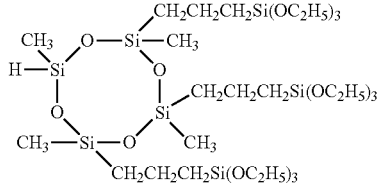

[Chem. 48]

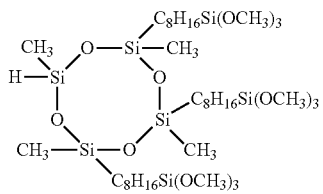

[Chem. 49]

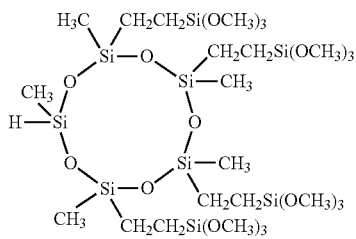

[Chem. 50]

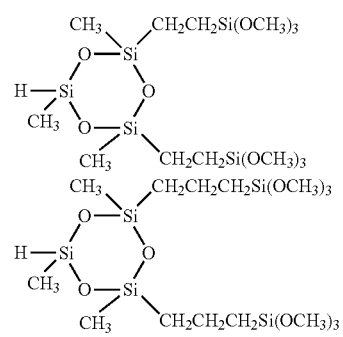

[Chem. 51]

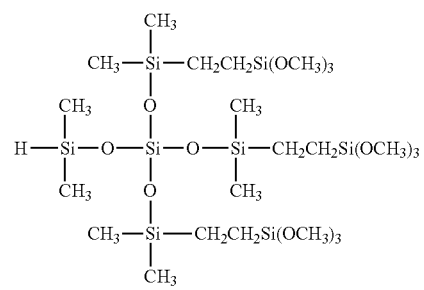

It is desirable that the reaction between a perfluoropolyether compound of formula (5) which has a terminally unsaturated group and a reactive silane compound of formula (6) be carried out by mixing these compounds and reacting the mixture in the presence of a platinum group metal-based addition reaction catalyst at a reaction temperature of 50 to 150° C., preferably 60 to 120° C., for 1 minute to 48 hours, particularly 10 minutes to 12 hours. If the reaction temperature is excessively low, the reaction may be stopped without sufficiently proceeding, and if the reaction temperature is excessively high, reaction heat from hydrosilylation may increase the temperature to the extent that it is impossible to control the reaction, leading to occurrence of bumping or decomposition of raw materials.

Here, it is desirable to set the reaction ratio between a perfluoropolyether compound of formula (5) which has a terminally unsaturated group and a reactive silane compound of formula (6) such that the number of moles of H in formula (6) is 0.9 to 2 times, particularly 1 to 1.05 times the total number of moles of terminally unsaturated groups in formula (5). It is desirable that all H in Formula (6) react.

As the addition reaction catalyst, for example, compounds containing a platinum group metal such as platinum, rhodium or palladium can be used. Among these compounds, compounds containing platinum are preferable, and hexachloroplatinic (IV) acid hexahydrate, a platinum carbonyl vinyl methyl complex, a platinum-divinyltetramethyldisiloxane complex, a platinum-cyclovinylmethylsiloxane complex, a platinum-octylaldehyde/octanol complex, or platinum supported on activated carbon can be used.

The compounding amount of the addition reaction catalyst is such that the amount of the contained metal is preferably 0.1 to 5,000 ppm by weight, more preferably 1 to 1,000 ppm by weight, with respect to the perfluoropolyether compound of formula (5) which has a terminally unsaturated group.

The above-described addition reaction can be carried out without the presence of a solvent, and may be diluted with a solvent if necessary. Here, as the diluent solvent, an organic solvent that is widely and generally used, such as toluene, xylene or isooctane, can be used, and a solvent is preferable which has a boiling point higher than the intended reaction temperature and does not inhibit the reaction and in which a perfluoropolyether of formula (1) generated after the reaction is soluble at the reaction temperature. As such a solvent, for example, a partially fluorine-modified solvent such as a fluorine-modified aromatic hydrocarbon-based solvent such as m-xylene hexafluoride or benzotrifluoride, or a fluorine-modified ether-based solvent such as methyl perfluorobutyl ether is desirable, and m-xylene hexafluoride is particularly preferable.

When a solvent is used, the amount of the solvent used is preferably 5 to 2,000 parts by weight, more preferably 50 to 500 parts by weight per 100 parts by weight of the perfluoropolyether compound of formula (5) which has a terminally unsaturated group.

If the amount of the solvent is less than the above-mentioned amount, the effect of dilution with the solvent may decrease, and if the amount of the solvent is more than the above-mentioned amount, the dilution degree may become excessively high, leading to a decrease in reaction rate.

It is preferable to remove the unreacted reactive silane compound of formula (6) and the diluent solvent by a known method such as distillation under reduced pressure, extraction, adsorption or the like after completion of the reaction. In particular, when the above-described fluorine-containing solvent having a boiling point of 260° C. or lower at normal pressure is contained, it is preferable to remove the solvent so that the amount of the fluorine-containing solvent is less than 1% by weight with respect to the entire surface modification component (B). The unreacted reactive silane compound of formula (6) and the volatile solvent containing no fluorine atom can also be used as constituent elements of the component (B).

The surface modification component (B) in the present invention may further contain a nonfunctional perfluoropolyether compound (b2). The nonfunctional perfluoropolyether compound (b2) is represented by the following general formula (2).

$$F—Rf'—F \quad (2)$$

Here, in the above formula (2), Rf' is a divalent perfluoropolyether group having a numerical average molecular weight of 1,500 to 20,000, and as long as the numerical average molecular weight falls within this range, compounds having a larger or smaller molecular weight may be contained.

Rf' can have the same structure as that shown for Rf, and may be identical to or different from Rf in structure, numerical average molecular weight and molecular weight distribution.

Examples of the nonfunctional perfluoropolyether compound (b2) include those shown below.

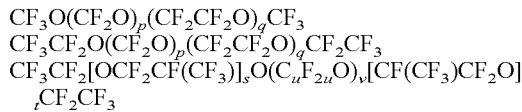

$CF_3O(CF_2O)_p(CF_2CF_2O)_qCF_3$
$CF_3CF_2O(CF_2O)_p(CF_2CF_2O)_qCF_2CF_3$
$CF_3CF_2[OCF_2CF(CF_3)]_sO(C_uF_{2u}O)_v[CF(CF_3)CF_2O]_tCF_2CF_3$
$CF_3CF_2CF_2O[CF(CF_3)CF_2O]_rCF_2CF_3$ (wherein p, q, p +q, s, t, s+t, u and v are as described above, and the sequence of each repeating unit of —$CF_2O$— and —$CF_2CF_2O$— is random.)

The nonfunctional perfluoropolyether compound (b2) may be contained beforehand as a by-product or a process contaminant of the perfluoropolyether compound (b1) in the component (b1) or the perfluoropolyether compound as a raw material of the component (b1). Here, adjustment can be performed by any known separation method such as adsorption treatment, extraction or thin-film distillation so that the content of the component (b2) with respect to the component (b1) falls within a range described later. Specifically, when there is a large difference in molecular weight between the component (b1) and the component (b2), separation by thin film distillation is suitable, and when separation by thin-film distillation is difficult, there is column chromatography using a filling agent such as silica gel whose adsorptivity varies due to a difference in terminal group between the component (b1) and component (b2) with the component (b1) dissolved in a poor solvent, or a method in which separation is performed using an extraction solvent by making use of a difference in solubility due to a difference in terminal group. In particular, adjustment can be performed by separating the components by chromatography using a supercritical solvent as a mobile phase.

On the other hand, the component (b2) may be intentionally blended with the component (b1) within the bounds of improving properties such as an oil-repellent property, a surface floating property. Here, the content of the nonfunctional perfluoropolyether compound (b2) is preferably 0.1 mol % or more per a total of 100 mol % of the perfluoropolyether compound (b1) and the nonfunctional perfluoropolyether compound (b2).

It is desirable that the nonfunctional perfluoropolyether compound (b2) in the present invention be contained in an amount such that the content ratio of the nonfunctional perfluoropolyether compound (b2) is less than 5 mol %, preferably 3.0 mol % or less, more preferably 1.5 mol % or less, still more preferably 1 mol % or less per a total of 100 mol % of the perfluoropolyether compound (b1) and the nonfunctional perfluoropolyether compound (b2). When the content ratio of the nonfunctional perfluoropolyether compound (b2) is above the range described above, solubility in the non-fluorine compound may decrease to the extent that a uniform coating film cannot be obtained when the composition is applied and cured as a final curable composition. When the component (b1) contains the component (b2) beforehand, the content of the component (b2) can be determined by isolating the component (b1) and the component (b2) by respective separation methods, and when the component (b1) does not contain the component (b2), the content of the component (b2) can be determined by the compounding amount.

The surface modification component (B) in the present invention is one which contains the perfluoropolyether compound (b1), and may further contain the nonfunctional perfluoropolyether compound (b2) in a content ratio of less than 5 mol % per a total of 100 mol % of the component (b1) and the component (b2) and in which the content of the fluorine-containing solvent having a boiling point of 260° C. or lower at normal pressure is less than 1% by weight with respect to the entire surface modification component (B).

The surface modification component (B) may be used as a solvent-free component, or may contain a volatile organic solvent (b3) free of a fluorine atom.

As such a volatile organic solvent (b3) free of a fluorine atom, any solvent can be used, and a compound containing only hydrogen atoms and carbon atoms or a compound containing only hydrogen atoms, carbon atoms and oxygen atoms is preferable. Specific examples thereof include hydrocarbon-based organic solvents, ketone-based organic solvents, ether-based organic solvents, ester-based organic solvents, and alcohol-based organic solvents. These solvents may be used alone or used in combination of two or more thereof.

Specific examples of the hydrocarbon-based organic solvent include pentane, hexane, heptane, isododecane, isooctane and cyclohexane. Specific examples of the ketone-based organic solvent include acetone, methyl ethyl ketone (MEK), methyl isobutyl ketone and cyclohexanone.

Specific examples of the ether-based organic solvent include diethyl ether, diisopropyl ether, dibutyl ether, tetrahydrofuran, polyethylene glycol monomethyl ether (MPEG) and tetraethylene glycol dimethyl ether.

Specific examples of the ester-based organic solvent include ethyl acetate, propyl acetate and butyl acetate.

Specific examples of the alcohol-based organic solvent include methanol, ethanol, isopropanol and n-butanol.

Among these volatile organic solvents free of a fluorine atom, hydrocarbon-based organic solvents are preferable because the perfluoropolyether compound for use in the present invention has further excellent solubility in these solvents.

It is desirable that the boiling point of the volatile organic solvent free of a fluorine atom be 0 to 260° C., preferably 30 to 200° C., more preferably 60 to 150° C. at normal pressure.

The use amount of the volatile organic solvent free of a fluorine atom is not particularly limited, the volatile organic solvent may be diluted at any ratio according to the application, and it is desirable that for example, 10 to 2,000 parts by weight of the volatile organic solvent be contained per 100 parts by weight of the component (b1).

In the present invention, by adding the above component (b1) or the component (b1) and a specific amount of the component (b2) as the surface modification component (B) to the curable component (A) such as an existing curable composition, the properties obtained from the perfluoropolyether compound of the component (b1) to the surface of the cured product without using a fluorine-containing solvent.

That is, the surface modification component (B) can be used as a surface modifier for a curable composition which is the curable component (A).

For the compounding amount of the component (B) with respect to the component (A), the total weight of the component (b1) and the component (b2) contained in the component (B) is 0.005 to 50 parts by weight, preferably 0.05 to 10 parts by weight per 100 parts by weight of the curable component (A) excluding volatile components. If this amount is excessively small, properties derived from the component (b1) cannot be sufficiently imparted to the surface, and if the amount is excessively large, undue effects may be exerted on physical properties such as hardness after curing of the component (A).

In the present invention, as the blending ratio between the component (A) and the component (B), the amount of the M group in general formula (1) of the component (b1) is in the range of preferably 0.0001 to 1.5 mol, particularly preferably 0.005 to 0.095 mol, per 1 mol of functional groups in the compound contained in the curable component (A) having a functional group capable of reacting with the M group in general formula (1) of the component (b1).

The components (A) and (B) may be mixed as one liquid during application to form a fluorine-containing curable composition, and instead of using only one-liquid composition obtained mixing all the components, a use pattern can also be adopted in which a plurality of compositions having different compositions, for example, those different in presence or absence of catalysts and various additives such as stabilizers, different in functional group of each constituent component or different in dilution degree, are prepared and mixed before application or molding.

The method for preparing the fluorine-containing curable composition of the present invention is not particularly limited, and the fluorine-containing curable composition can be obtained by mixing the component (B) with the component (A) in accordance with a heretofore known method. In the fluorine-containing curable composition of the present invention, the content of the fluorine-containing solvent having a boiling point of 260° C. or lower at normal pressure is preferably less than 1% by weight with respect to the entire composition as described above.

Conditions for curing the fluorine-containing curable composition of the present invention may be appropriately selected in accordance with a heretofore known method according to the type of the component (A) used and the combination of the component (b1).

In particular, heating at a temperature in the range of 20° C. to 200° C. for about 5 minutes to 48 hours is preferable, and for example, a method in which curing proceeds at 25° C. for 1 month can also be used.

As a general pattern of using the fluorine-containing curable composition of the present invention, the fluorine-containing curable composition layer of the present invention can be applied onto any substrate as long as a fluorine-containing curable composition layer according to the present invention is closely attached or bonded to the substrate after curing, and examples thereof include various materials such as paper, cloth, metal and oxides thereof, leather, synthetic leather, wood, glass, ceramic and quartz, resin substrates such as substrates of polyethylene terephthalate, polybutylene terephthalate, polyethylene naphthalate, polyethylene, polypropylene, cellophane, diacetyl cellulose, triacetyl cellulose, acetyl cellulose butyrate, cellulose acetate propionate, cycloolefin polymers, cycloolefin copolymers, polyvinyl chloride, polyvinylidene chloride, polyvinyl alcohol, ethylene-vinyl acetate copolymers, polystyrene, polycarbonate, polymethylpentene, polysulfone, polyether ether ketone, polyether imide, polyimide, fluororesins, nylon resins, urethane resins, epoxy resin and acrylic resins, coating films of these resins. The composition can be used on a surface of any form such as a film, a plate and a molded member.

The cured film (cured resin layer) formed using the fluorine-containing curable composition of the present invention is useful as coating films and surface protective films for housings, display sections and operation sections of tablet computers, notebook PCs, portable (communication) information terminals such as mobile phones and smartphones, digital media players, digital cameras, digital video cameras and electronic book readers, watch-type and eyeglass-type wearable computers, various flat panel displays such as head-mounted displays, liquid crystal displays, plasma displays, organic EL (electroluminescence) displays, rear projection-type displays, fluorescent display tubes (VFDs), field emission projection displays, CRTs, tonerbased displays and quantum dot (QD) displays, surfaces of display operation devices for TV screens, various optical films used in the inner parts thereof, GPS display recorders, navigation devices for automobiles etc., control panels for automobiles etc., automatic teller machines, cash dispensers, vending machines, digital signages (electronic signboards), security system terminals, POS terminals, various controllers such as remote controllers, display input devices such as panel switches for in-vehicle devices, glossy surfaces of pianos and furniture, surfaces of building stone materials such as marble stone, surfaces of furniture furnishings, decorative building materials for water sections such as toilets, baths and washrooms, protective glass for display of works of art, store windows, store cases, covers for photo frames, wristwatches, exteriors of cosmetic containers, exteriors of accessories, exteriors of accessory containers, glass for automobile windows, resins and metals of automobiles, overcoats for painting of automobiles, indoor and outdoor signboards, advertising displays, roadway signs, direction boards, painting of display parts of various traffic signs and LED signs, displays of automobile electronic mirrors, outdoor painting of various buildings, window glass and interiors and outdoors of transport apparatuses of trains, aircrafts and the like, members made of transparent glass or transparent plastic (e.g. acrylic resin or polycarbonate) for automobile headlights and tail ramps), cover members for dedicated sensors of millimeter-wave radars, and various mirror members.

Further, the cured film is also useful as a surface protective film for optical components and optical devices such as eyeglass lenses, prisms, lens sheets, pellicle films, polarizing plates, optical filters, lenticular lenses, Fresnel lenses, antireflection films, lenses for various cameras, protective filters for various lenses, and optical fibers and optical couplers.

Examples of the application method for applying the fluorine-containing curable composition to a surface of a substrate include a gravure coater, a roll coater, a bar (rod) coater, a blade coater, a knife coater, a die coater, an impregnation coater, a screen coater, a spin coater, a curtain coater and a spray coater.

The thickness of the cured film obtained by applying and curing the fluorine-containing curable composition of the present invention is not particularly limited, and is preferably 0.1 μm to 3 mm, more preferably 1 μm to 1 mm when the fluorine-containing curable composition is applied as any of various protective films to a surface of an article.

The fluorine-containing curable composition of the present invention as described above is essentially intended to give excellent levels of properties such as a water-repellent property, an oil-repellent property, an anti-fouling property, a fingerprint-proof property, fingerprint removability, fingerprint removability, slipperiness, abrasion resistance, scratch resistance, solvent resistance, chemical resistance, a liquid droplet slip drop property, a deposited snow slip drop property, a deposited ice slip drop property, an antifogging property, a surface leveling property, mold releasability, a low-refractive-index property and an antireflection property, in addition to the properties of the component (A) alone, to a cured product of the fluorine-containing curable composition of the present invention by disposing a fluoropolyether structure derived from components (b1) and (b2) in the surface modification component (B) according to the present invention on a surface of a cured product of the curable component on a surface of a target article. Thus, when the composition and the use conditions of the curable component (A) in the present invention are within the ranges of known compositions and use conditions, selection of the composition or blending, application and curing conditions for adjustment of an application property, curability, operability, adhesion, an adhesive property, and various post-curing properties of the fluorine-containing curable composition of the present invention can be achieved by a screening operation using a combination of existing techniques.

When the fluorine-containing curable composition of the present invention is used, an appropriate use method may be selected within the above-described ranges, on the basis of a known technique corresponding to each use according to a combination of compounds, a composition ratio, and what properties are emphasized. For the known techniques, not only those for the composition containing fluorine, but also methods used for the curable composition can be included in the scope of consideration.

For example, when various compounds are combined within the above-described range as the curable component (A) in the fluorine-containing curable composition of the present invention, the type and the amount of a known curing agent are selected so as to meet intended curing conditions, reactive hollow silica or hollow silica having no reactive group is blended when a low-refractive-index property or a low-reflection property associated therewith is emphasized, various inorganic compounds are blended for reducing a volume change before and after curing, an antistatic agent is blended for prevention of static charge, an ultraviolet absorber is blended for UV resistance, and adjustment is performed so as to obtain a coating film thickness appropriate for preventing interference fringes in application of the composition, or deformation of after curing of a coating film obtained by applying the fluorine-containing curable composition or breakage of the coating film is suppressed by adjusting the thickness of a substrate to facilitate suppression of curling and the like or adjust the elastic modulus of the substrate. Such an action is selected by performing a screening operation on the basis of a combination of existing conditions suitable for the respective properties, and can be easily achieved by a combination of the present invention with existing techniques.

The fluorine-containing curable composition of the present invention provides a cured product having an excellent anti-fouling property, water-repellent property, an oil-repellent property and fingerprint-proof property on a surface of a substrate when applied to a surface of the substrate and cured, or cured alone. This provides a cured product surface which is hardly contaminated by rain, dust, pollen, feces of living organisms, dirt from collision of insects, fingerprints and human grease such as sebum or sweat, attachment of cosmetics or the like, graffiti with ink or coating material, or the like, is excellent in wipe-off property against dirt attached, and ensures that a sticky material such as gum or seal can be easily removed when attached. Thus, the fluorine-containing curable composition of the present invention is particularly useful as a hard coat agent used for forming a coating film or a protective film on various molded products.

EXAMPLES

Preparation Examples, Synthesis Examples, Examples and Comparative Examples are given below to more concretely illustrate the present invention, although the present invention is not limited by these Examples.

[Preparation of Curable Component (A)]
[Preparation Example A-1]

A 1 liter flask equipped with a stirrer, a Liebig cooler, a dropping funnel and a thermometer was charged with 96.1 parts by weight of a compound of the average composition formula of $CH_3(CH_3O)_2SiOSi(OCH_3)_2CH_3$, 18.0 parts by weight of a compound of $(CH_3)_2Si(OCH_3)_2$, and 76.9 parts by weight of toluene, and 3.4 g of methanesulfonic acid was added with stirring, 27.0 parts by weight of water was then further added dropwise over 1 hour, and the mixture was aged at 30° C. for 12 hours.

The obtained liquid was neutralized with sodium bicarbonate, and an alcohol produced as a side product was distilled off, the liquid was washed with water, water was removed, and the liquid was filtered, and then diluted with toluene to a nonvolatile content of 40% by weight as measured after the liquid was left standing at 105° C. for 3 hours, thereby obtaining a silicone resin having a viscosity at 25° C. of 8 mm²/s as measured by Cannon-Fenske and containing a silanol group having a hydroxyl group content of 2.2% by weight as measured by a Grignard method.

250 parts by weight of the obtained silicone resin (100 parts by weight of active ingredients),
1 part by weight of $(C_4H_9O)Al(OC(CH_3)=CHCOOC_2H_5)_2$ as a curing catalyst, and
150 parts by weight of methyl isobutyl ketone as a solvent
were mixed to prepare a curable component A-1 containing a compound containing a silanol group.

[Preparation Example A-2]
50 parts by weight of $(CH_3)(CH_3O)_2SiOSi(OCH_3)_2(CH_3)$,
40 parts by weight of $(CH_3)_2Si(OCH_3)_2$ and
10 parts by weight of $(C_4H_9O)Al(OC(CH_3)=CHCOOC_2H_5)_2$
were mixed to obtain a curable component A-2 containing a compound containing an alkoxy group.

[Preparation Example A-3]
90 parts by weight of a random copolymer of methyl methacrylate (MMA) and 2-hydroxy-ethyl methacrylate (HEMA) (MMA/HEMA (molar ratio)=88/12, numerical average molecular weight: 8,400, OH group content: 0.0011 mol/g),
10 parts by weight of isophorone diisocyanate,
0.1 parts by weight of dioctyltin dilaurate,
150 parts by weight of tetrahydrofuran; and
150 parts by weight of methyl isobutyl ketone 150
were mixed to obtain a curable component A-3 containing a compound having 9.7 hydroxyl groups on average per molecule and a compound having 2 isocyanate groups.

[Preparation Example A-4]
100 parts by weight of ZX-1059 (NIPPON STEEL Chemical & Material Co., Ltd.) (mixture of bisphenol A type/F-type diglycidyl ether, n=0),
1 part by weight of a thermal photoacid generator (TA-100 from San-Apro Ltd.), and
149 parts by weight of butyl acetate
were mixed to obtain a curable component A-4 containing a compound containing an epoxy group.

[Synthesis of Component (b1)]
[Synthesis Example 1]

In a 200 mL four-necked flask equipped with a reflux apparatus and a stirrer in a dry air atmosphere, 50.0 g (Si—H group: 0.067 mol) of a mixture containing a compound of the following formula:

[Chem. 52]

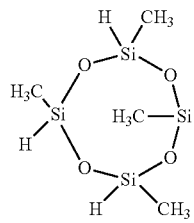 —$CH_2$—$CH_2$—$CH_2$—O—$CH_2$—$Rf^1$—$CH_2$—O—$CH_2$—$CH_2$—$CH_2$— 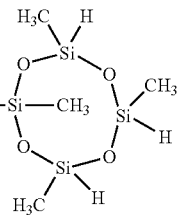

($Rf^1$: —$CF_2O(CF_2CF_2O)_{21.4}(CF_2O)_{22.5}CF_2$—, provided that the number of the repeating units is an average value determined by $^{19}F$-NMR, and the same applies to the following Examples)
and 0.79 mol % of a nonfunctional perfluoropolyether compound (b2-1) of the following formula:

16.3 g (0.070 mol) of $CH_2$=$CH(CH_2)_6Si(OCH_3)_3$, 50.0 g of m-xylene hexafluoride (boiling point: 116° C.), and 0.0884 g of a toluene solution of chloroplatinic acid/vinylsiloxane complex (containing 2.2×10⁻⁷ mol of the complex in terms of Pt alone) were mixed, and the mixture was stirred at 100° C. for 4 hours. Disappearance of a peak derived from a Si—H group was confirmed by $^1H$-NMR and IR, the reaction solution was cooled to room temperature. Subsequently, distillation was performed under reduced pressure for 2 hours under the condition of 100° C./267 Pa with an evaporator to remove m-xylene hexafluoride and unreacted $CH_2$=$CH(CH_2)_6Si(OCH_3)_3$, thereby obtaining 56.8 g of a mixture (II-1) containing a compound (b1-1) of the following formula and 0.72 mol % of the nonfunctional perfluoropolyether compound (b2-1). In addition, in the $^{19}F$-NMR spectrum, a peak of the $CF_3$ group of m-xylene hexafluoride was not observed at −64 ppm, and the residual amount of m-xylene hexafluoride was 0% by weight.

[Chem. 53]

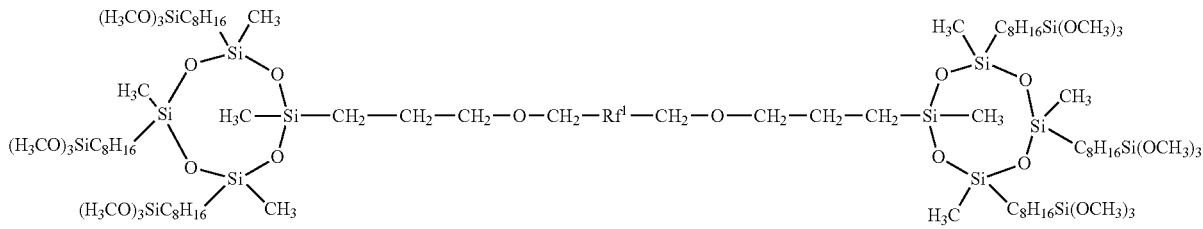

[Synthesis Example 2]

A compound (b2-2) of the following formula was added to the mixture (II-1) from Synthesis Example 1 to obtain 10.2 g of a mixture (II-2) containing a total of 3.0 mol % of the component corresponding to (b2).

$CF_3CF_2O(CF_2CF_2O)_{20.5}(CF_2O)_{22.1}CF_2CF_3$

[Synthesis Example 3]

A compound (b2-2) of the above formula was added to the mixture (II-1) from Synthesis Example 1 to obtain 10.4 g of a mixture (II-3) containing a total of 4.8 mol % of the component corresponding to (b2).

[Synthesis Example 4]

In a 200 mL four-necked flask equipped with a reflux apparatus and a stirrer in a dry air atmosphere, 50.0 g (Si—H group: 0.067 mol) of a compound (III) of the following formula for which it was confirmed a $CF_3$- group (terminal) derived from a nonfunctional perfluoropolyether compound (b2) was not detectable by $^{19}$F-NMR:

[Chem. 54]

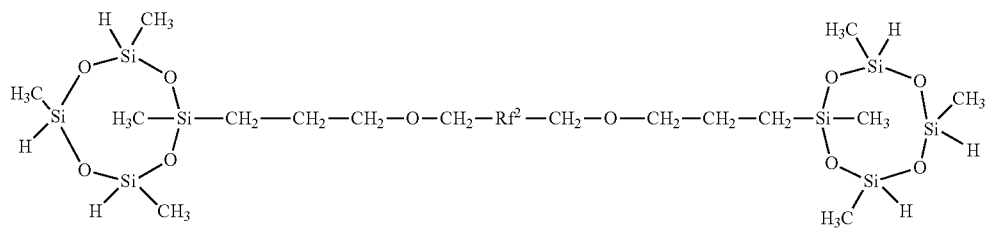

($Rf^2$: —$CF_2O(CF_2CF_2O)_{20.9}(CF_2O)_{21.2}CF_2$—, 16.3 g (0.070 mol) of $CH_2$=$CH(CH_2)_6Si(OCH_3)_3$, 50.0 g of m-xylene hexafluoride, and 0.0884 g of a toluene solution of chloroplatinic acid/vinylsiloxane complex (containing 2.2× $10^{-7}$ mol of the complex in terms of Pt alone) were mixed, and the mixture was stirred at 100° C. for 4 hours. Disappearance of a peak derived from a Si-H group was confirmed by $^1$H-NMR and IR, the reaction solution was cooled to room temperature. Subsequently, m-xylene hexafluoride and unreacted $CH_2$=$CH(CH_2)_6Si(OCH_3)_3$ were removed to obtain 56.9 g of a compound (IV-I) of the following formula which is free of the component (b2). In addition, the residual amount of m-xylene hexafluoride was 0.002% by weight as determined from a peak integral value of $CF_3$ groups of m-xylene hexafluoride in a $^{19}$F-NMR spectrum with hexafluorobenzene as a standard substance.

[Chem. 55]

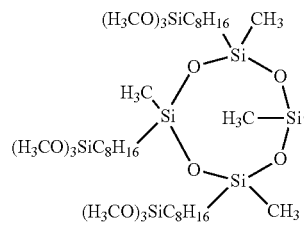 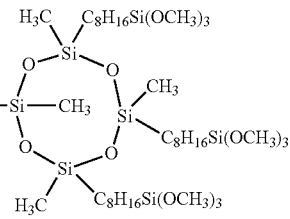

[Preparation of surface modification component (B)]

Undiluted or 80 parts by weight of MEK were blended to 20 parts by weight of each of the mixtures (II-1), (II-2) and (II-3) of Synthesis Examples, a compound (IV-1), and a compound (V) of the following formula which had been synthesized in accordance with the method described in JP-A 2012-233157. In this way, surface modification components (B1 to 7) of Table 1 below were prepared.

[Chem. 56]

$(H_3CO)_3Si-CH_2-CH_2-CH_2-O-CH_2-Rf^2-CH_2-O-CH_2-CH_2-CH_2-Si(OCH_3)_3$ $(Rf^2: -CF_2O(CF_2CF_2O)_{20.9}(CF_2O)_{21.2}CF_2-)$

In addition, Synthesis Examples II-1 and II-2 and solvents were blended as in Table 2 to prepare a surface modification components (B8 to 12).

formulation shown in Table 3 to 8, and application, curing and evaluation of cured products were performed by the following methods. Samples which became cloudy at the time of preparing the fluorine-containing curable composition was not cured and evaluated any more.

[Application and Curing of Fluorine-Containing Curable Composition]

Method for Application and Curing (1):

The fluorine-containing curable composition was applied onto a glass plate with a wire bar having a gap of 24 μm, left standing at 150° C. for 1 hour, and then naturally cooled to room temperature to obtain a cured film.

TABLE 1

|  | B-1 | B-2 | B-3 | B-4 | B-5 | B-6 | B-7 |
|---|---|---|---|---|---|---|---|
| Synthesis Example | 1 | 2 | 3 | 4 | 4 | 5 | 5 |
| Mixture or compound | (II-1) | (II-2) | (II-3) | (IV-1) | (IV-1) | (V) | (V) |
| Compounding amount (pbw) | 20 | 20 | 20 | 20 | 20 | 20 | 20 |
| (b2) mol % | 0.72 | 3.0 | 4.8 | 0 | 0 | 0 | 0 |
| Compounding amount of MEK (pbw) | 80 | 80 | 80 | 80 | 0 | 80 | 0 |
| Appearance | Transparent | Transparent | Slight cloudy | Transparent | Slight cloudy | Cloudy | Slight cloudy |

(b2) mol % indicates a value relative against the total amount of component (b1) and component (b2), which is defined as 100 mol %

TABLE 2

|  | B-8 | B-9 | B-10 | B-11 | B-12 |
|---|---|---|---|---|---|
| Synthesis Example | 1 | 1 | 1 | 2 | 2 |
| Compound | (II-1) | (II-1) | (II-1) | (II-2) | (II-2) |
| Compound Compounding amount (pbw) | 10 | 20 | 40 | 20 | 20 |
| (b2) mol % | 0.72 | 0.72 | 0.72 | 3.0 | 3.0 |
| Type of solvent | Heptane | N-butanol | Hexane | Isododecane | MPEG |
| Compounding amount of solvent (pbw) | 90 | 80 | 60 | 80 | 80 |
| Appearance | Transparent | Transparent | Transparent | Transparent | Transparent |

(b2) mol % indicates a value relative against the total amount of component (b1) and component (b2), which is defined as 100 mol %

[Examples 1 to 20 and Comparative Examples 1 to 9]
[Preparation of Fluorine-Containing Curable Composition and Results of Evaluation]

Fluorine-containing curable compositions of the present invention and Comparative Examples which do not correspond to the present invention were prepared with the Method for Application and Curing (2):

The fluorine-containing curable composition was applied onto a polycarbonate plate with a wire bar having a gap of 12 μm, left standing in an environment at 25° C. for 48 hours to obtain a cured film.

Method for Application and Curing (3):

The fluorine-containing curable composition was applied onto a glass plate with a wire bar having a gap of 18 μm, left standing in an environment at 120° C. for 2 hours, and then naturally cooled to room temperature to obtain a cured film.

Method for Application and Curing (4):

The fluorine-containing curable composition was applied onto a glass plate by spin coating at 3,000 rpm for 30 seconds, left standing in an environment at 100° C. for 1 hour, and then naturally cooled to room temperature to obtain a cured film.

Evaluation Method

[Appearance]

The transparency of the coating film and existence or non-existence of defects were examined.

[Water Contact Angle]

The water contact angle was measured at a liquid volume of 2 μL using a contact angle meter (A3 Type manufactured by Kyowa Interface Science Co., Ltd.).

[Felt Marker Ink-Repellent Property]

For the felt marker ink-repellent property, the degree of repellency was visually examined when a line was drawn on a surface of the cured film using Hi-Mckee Black Bold manufactured by ZEBRA Co., Ltd.

[Fingerprint Wipe-Off Property]

A fingerprint was put on the surface, and then wiped off with tissue paper, and the appearance was then visually evaluated.

TABLE 3

|  | Example 1 | Example 2 | Example 3 | Example 4 | Example 5 |
| --- | --- | --- | --- | --- | --- |
| Component (A) | A-1 | A-1 | A-1 | A-1 | A-2 |
| Number of parts by weight of (A) | 100 | 100 | 100 | 100 | 100 |
| Component (B) | B-1 | B-2 | B-4 | B-5 | B-1 |
| Number of parts by weight of (B) | 1.25 | 1.25 | 1.25 | 0.25 | 5 |
| Appearance in mixing | Transparent | Transparent | Transparent | Transparent | Transparent |
| Method for application and curing | (1) | (1) | (1) | (1) | (2) |
| Film thickness after curing | 15 μm | 15 μm | 15 μm | 15 μm | 12 μm |
| Appearance of film after curing | Transparent and smooth | Transparent and smooth | Transparent and smooth | Transparent and smooth | Transparent and smooth |
| Water contact angle (°) | 111 | 113 | 112 | 111 | 110 |
| Felt marker ink-repellent property | Well repellent | Well repellent | Well repellent | Well repellent | Well repellent |
| Fingerprint wiping property | Easily wiped off | Easily wiped off | Easily wiped off | Easily wiped off | Easily wiped off |

TABLE 4

|  | Example 6 | Example 7 | Example 8 | Example 9 | Example 10 |
| --- | --- | --- | --- | --- | --- |
| Component (A) | A-2 | A-2 | A-3 | A-3 | A-3 |
| Number of parts by weight of (A) | 100 | 100 | 100 | 100 | 100 |
| Component (B) | B-2 | B-5 | B-1 | B-2 | B-5 |
| Number of parts by weight of (B) | 5 | 1 | 5 | 1.25 | 0.25 |
| Appearance in mixing | Transparent | Transparent | Transparent | Transparent | Transparent |
| Method for application and curing | (2) | (1) | (1) | (3) | (3) |
| Film thickness after curing | 15 μm | 24 μm | 6 μm | 4.5 μm | 4.5 μm |
| Appearance of film after curing | Transparent and smooth | Transparent and smooth | Transparent and smooth | Transparent and smooth | Transparent and smooth |
| Water contact angle (°) | 111 | 112 | 112 | 113 | 113 |
| Felt marker ink-repellent property | Well repellent | Well repellent | Well repellent | Well repellent | Well repellent |
| Fingerprint wiping property | Easily wiped off | Easily wiped off | Easily wiped off | Easily wiped off | Easily wiped off |

TABLE 5

|  | Example 11 | Example 12 | Example 13 | Example 14 | Example 15 |
| --- | --- | --- | --- | --- | --- |
| Component (A) | A-4 | A-4 | A-1 | A-1 | A-1 |
| Number of parts by weight of (A) | 100 | 100 | 100 | 100 | 100 |
| Component (B) | B-2 | B-5 | B-8 | B-9 | B-10 |
| Number of parts by weight of (B) | 0.5 | 0.25 | 1.25 | 1.25 | 1.25 |

TABLE 5-continued

|  | Example 11 | Example 12 | Example 13 | Example 14 | Example 15 |
| --- | --- | --- | --- | --- | --- |
| Appearance in mixing | Transparent | Transparent | Transparent | Transparent | Transparent |
| Method for application and curing | (4) | (4) | (1) | (1) | (1) |
| Film thickness after curing | 4 μm | 4 μm | 15 μm | 15 μm | 15 μm |
| Appearance of film after curing | Transparent and smooth* | Transparent and smooth* | Transparent and smooth | Transparent and smooth | Transparent and smooth |
| Water contact angle (°) | 113 | 112 | 112 | 111 | 113 |
| Felt marker ink-repellent property | Well repellent | Well repellent | Well repellent | Well repellent | Well repellent |
| Fingerprint wiping property | Easily wiped off | Easily wiped off | Easily wiped off | Easily wiped off | Easily wiped off |

*Slightly red color was observed immediately after heating, but disappeared with the lapse of time

TABLE 6

|  | Example 16 | Example 17 | Example 18 | Example 19 | Example 20 |
| --- | --- | --- | --- | --- | --- |
| Component (A) | A-2 | A-2 | A-3 | A-1 | A-3 |
| Number of parts by weight of (A) | 100 | 100 | 100 | 100 | 100 |
| Component (B) | B-11 | B-12 | B-5 | B-3 | B-3 |
| Number of parts by weight of (B) | 0.15 | 0.5 | 0.25 | 0.1 | 0.1 |
| Appearance in mixing | Transparent | Transparent | Transparent | Slight cloudy | Slight cloudy |
| Method for application and curing | (1) | (2) | (3) | (4) | (4) |
| Film thickness after curing | 24 μm | 12 μm | 4.5 μm | 5 μm | 2 μm |
| Appearance of film after curing | Transparent and smooth | Transparent and smooth | Transparent and smooth | Slightly cloudy and smooth | Transparent and smooth |
| Water contact angle (°) | 111 | 113 | 113 | 112 | 113 |
| Felt marker ink-repellent property | Well repellent | Well repellent | Well repellent | Well repellent | Well repellent |
| Fingerprint wiping property | Easily wiped off | Easily wiped off | Easily wiped off | Easily wiped off | Easily wiped off |

TABLE 7

|  | Comparative Example 1 | Comparative Example 2 | Comparative Example 3 | Comparative Example 4 | Comparative Example 5 |
| --- | --- | --- | --- | --- | --- |
| Component (A) | A-1 | A-1 | A-2 | A-3 | A-4 |
| Number of parts by weight of (A) | 100 | 100 | 100 | 100 | 100 |
| Component (B) | B-6 | B-7 | B-7 | B-7 | B-7 |
| Number of parts by weight of (B) | 1.25 | 0.25 | 1 | 0.25 | 0.1 |
| Appearance in mixing | Cloudy | Cloudy | Cloudy | Cloudy | Cloudy |

TABLE 8

|  | Comparative Example 6 | Comparative Example 7 | Comparative Example 8 | Comparative Example 9 |
| --- | --- | --- | --- | --- |
| Component (A) | A-1 | A-2 | A-3 | A-4 |
| Number of parts by weight of (A) | 100 | 100 | 100 | 100 |
| Component (B) | — | — | — | — |
| Number of parts by weight of (B) | 0 | 0 | 0 | 0 |
| Appearance | Transparent | Transparent | Transparent | Transparent |
| Method for application and curing | (1) | (2) | (3) | (4) |
| Appearance of film after curing | Transparent and smooth | Transparent and smooth | Transparent and smooth | Transparent and smooth |
| Water contact angle (°) | 95 | 92 | 79 | 84 |
| Felt marker ink-repellent property | Not repellent | Not repellent | Not repellent | Not repellent |
| Fingerprint wiping property | Hardly wiped off | Hardly wiped off | Hardly wiped off | Hardly wiped off |

The invention claimed is:

1. A fluorine-containing curable composition comprising
a curable component (A), which is formed into a cured product by heat or moisture, including at least one compound selected from compounds having a hydrolyzable silyl group, a silanol group, a hydroxyl group, a carboxyl group, an amino group, an epoxy group, a mercapto group, an isocyanate group or a carboxylic anhydride group, with proviso that a compound having a hydrolyzable silyl group is free of a fluorine atom in the molecule, or, a resin composition selected from a urethane resin composition, an epoxy resin composition, a melamine resin composition, an alkyd resin composition or a silicone resin composition, containing at least one selected from the above compounds; and
a surface modification component (B) containing a perfluoropolyether compound (b1) of the following general formula (1), the surface modification component (B) containing 0.005 to 50 parts by weight of the perfluoropolyether compound (b1) per 100 parts by weight of the curable component (A) excluding volatile components:

$$[M_cR_bSi-Z^2]_a-Q^1-Z^1-Rf-Z^1-Q^1-[Z^2-SiR_bM_c]_a \quad (1)$$

wherein Rf is a divalent perfluoropolyether group having a numerical average molecular weight of 1,500 to 20,000;
each $Z^1$ is independently a divalent linking group, optionally contains an oxygen atom, a nitrogen atom, a fluorine atom or a silicon atom, and may be a group having a cyclic structure and/or an unsaturated bond;
each $Z^2$ is independently a divalent hydrocarbon group having 2 to 20 carbon atoms, may have a cyclic structure, and optionally contains an intermediate ether bond (—O—);
each $Q^1$ is independently a linking group with a valence of (a+1), has a structure with two or more of a hydrogen atom, a carbon atom, an oxygen atom, a silicon atom and a nitrogen atom, and may have a ring shape;
each a is independently an integer of 1 to 10, each b is independently an integer of 0 to 2, each c is independently an integer of 1 to 3, and b and c on one silicon atom satisfy b+c=3; all "a" number of $Z^2$ in the square bracket in formula (1) are bonded to the silicon atom in the $Q^1$ structure;
each R is independently a monovalent hydrocarbon group having 1 to 6 carbon atoms; and
each M is independently a group selected from the group consisting of an alkoxy group having 1 to 10 carbon atoms, an alkoxyalkyl group having 2 to 10 carbon atoms, an alkoxyalkoxy group having 2 to 10 carbon atoms, an acyloxy group having 1 to 10 carbon atoms, an alkenyloxy group having 2 to 10 carbon atoms, and a halogen group, and
wherein the surface modification component (B) further contains a non-functional perfluoropolyether compound (b2) of the following general formula (2) at less than 5 mol % per a total of 100 mol % of the perfluoropolyether compound (b1) of general formula (1) and the component (b2), the total amount of the component (b1) and the component (b2) in the surface modification component (B) is 0.005 to 50 parts by weight per 100 parts by weight of the curable component (A) excluding volatile components, and the content of a fluorine-containing solvent having a boiling point of 260° C. or lower at normal pressure is less than 1% by weight with respect to the entire component (B):

$$F-Rf'-F \quad (2)$$

wherein Rf' is a divalent perfluoropolyether group having a numerical average molecular weight of 1,500 to 20,000.

2. The fluorine-containing curable composition according to claim 1, wherein in formulae (1) and (2), Rf and Rf' each include a repeating unit having at least one structure selected from the group of the following divalent perfluoroether groups:
—$CF_2O$—;
—$CF_2CF_2O$—;
—$CF_2CF_2CF_2O$—;
—$CF(CF_3)CF_2O$—;
—$CF_2CF_2CF_2CF_2O$—;
—$CF_2CF_2CF_2CF_2CF_2O$—; and
—$CF_2CF_2CF_2CF_2CF_2CF_2O$—, and
a perfluoroalkylene group having 1 to 6 carbon atoms.

3. The fluorine-containing curable composition according to claim 1, wherein in formulae (1) and (2), Rf and Rf' each has one of:
—$CF_2O(CF_2O)_p(CF_2CF_2O)_qCF_2$—
—$CF_2CF_2O(CF_2O)_p(CF_2CF_2O)_qCF_2CF_2$—
wherein p is an integer of 10 to 290, q is an integer of 5 to 170, and p+q is an integer of 15 to 295; the sequence of the repeating units of —$CF_2O$— and —$CF_2CF_2O$— is random; or
—$CF(CF_3)[OCF_2CF(CF_3)]_sO(C_uF_{2u}O)_v[CF(CF_3)CF_2O]_tCF(CF_3)$—
—$CF_2CF_2CF_2O[CF(CF_3)CF_2O]tCF_2CF_2$—
wherein each of s and t is independently an integer of 1 to 120, s+t is an integer of 4 to 121, u is an integer of 1 to 6, and v is an integer of 0 to 10.

4. The fluorine-containing curable composition according to claim 1, wherein
in formula (1), $Z^2$ has the following formula:
—$(CH_2)_w$—
wherein w is an integer of 2 to 20.

5. The fluorine-containing curable composition according to claim 1, wherein in formula (1), each $Q^1$ is independently a linking group with a valence of (a+1) which has a siloxane structure with at least (a+1) number of silicon atoms, an unsubstituted or halogen-substituted silalkylene structure, a silarylene structure, or a combination of two or more thereof.

6. The fluorine-containing curable composition according to claim 1, wherein in formula (1), $Q^1$ is a cyclic siloxane structure.

7. The fluorine-containing curable composition according to claim 1, wherein in formula (1), $Z^1$ is one selected from —$CH_2CH_2$—;   —$CH_2CH_2CH_2$—;
—$CH_2CH_2CH_2CH_2$—;   —$CH_2OCH_2CH_2$—;
—$CH_2OCH_2CH_2CH_2$—;

[Chem. 1]

—$O$—$CH_2CH_2CH_2$—

—$N$—$CH_2CH_2CH_2$—

-continued

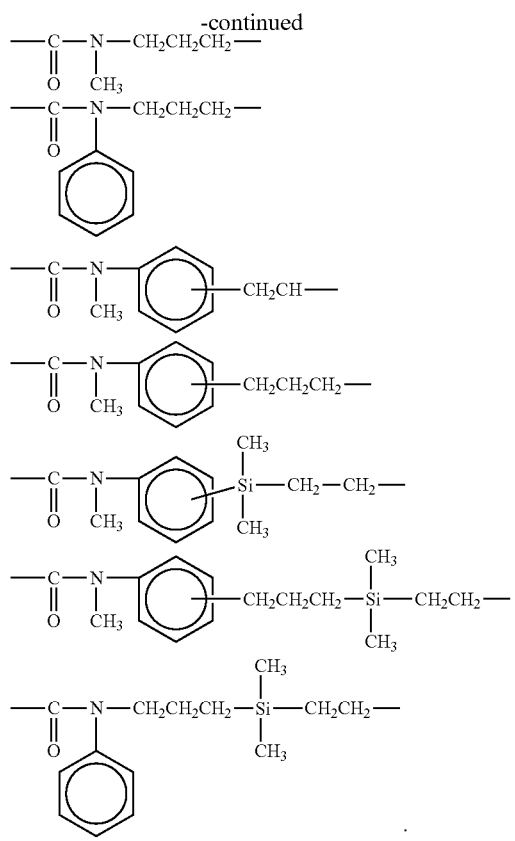

8. The fluorine-containing curable composition according to claim 1, wherein the surface modification component (B) further contains 10 to 2,000 parts by weight of a volatile organic solvent (b3) free of a fluorine atoms per 100 parts by weight of the component (b1).

9. The fluorine-containing curable composition according to claim 1, wherein the curable component (A) contains at least one compound selected from compounds having a hydroxyl group, a carboxyl group, an amino group, an epoxy group, a mercapto group, an isocyanate group, a hydrolyzable silyl group, a silanol group and a carboxylic anhydride group, and is reacted and cured by heat or moisture.

10. The fluorine-containing curable composition according to claim 1, wherein the curable component (A) contains a hydrolyzable silane compound, a hydrolyzable siloxane compound or a silanol group-containing silicone resin which is free of a fluorine atom.

11. The fluorine-containing curable composition according to claim 1, wherein the curable component (A) contains at least one of tetraalkoxysilane, trialkoxysilane and dialkoxysilane, or a partial hydrolytic condensate thereof, or a hydrolyzed/partially condensed product of the partial hydrolytic condensate.

12. The fluorine-containing curable composition according to claim 1, wherein the curable component (A) contains a compound free of a fluorine atom which has two or more isocyanate groups per molecule and a compound free of a fluorine atom which has two or more hydroxyl groups per molecule.

13. The fluorine-containing curable composition according to claim 1, wherein the curable component (A) contains an epoxy compound free of a fluorine atom.

14. The fluorine-containing curable composition according to claim 1, wherein the water contact angle of a surface of the cured product is 100° or more.

15. An article having a cured film of the fluorine-containing curable composition according to claim 1 on a surface thereof.

16. A fluorine-containing curable composition comprising a curable component (A), which is formed into a cured product by heat or moisture, including at least one compound selected from compounds having a hydrolyzable silyl group, a silanol group, a hydroxyl group, a carboxyl group, an amino group, an epoxy group, a mercapto group, an isocyanate group or a carboxylic anhydride group, with proviso that a compound having a hydrolyzable silyl group is free of a fluorine atom in the molecule, or, a resin composition selected from a urethane resin composition, an epoxy resin composition, a melamine resin composition, an alkyd resin composition or a silicone resin composition, containing at least one selected from the above compounds; and a surface modification component (B) containing a perfluoropolyether compound (b1) of the following general formula (1), the surface modification component (B) containing 0.005 to 50 parts by weight of the perfluoropolyether compound (b1) per 100 parts by weight of the curable component (A) excluding volatile components:

$$[M_cR_bSi—Z^2]_a—Q^1—Z^1—Rf—Z^1—Q^1—[Z^2—SiR_bM_c]_a \quad (1)$$

wherein Rf is a divalent perfluoropolyether group having a numerical average molecular weight of 1,500 to 20,000, and has one of:

—$CF_2O(CF_2O)_p(CF_2CF_2O)_qCF_2$—
—$CF_2CF_2O(CF_2O)_p(CF_2CF_2O)_qCF_2CF_2$— wherein p is an integer of 10 to 290, q is an integer of 5 to 170, and p+q is an integer of 15 to 295; the sequence of the repeating units of —$CF_2O$— and —$CF_2CF_2O$— is random; or —$CF(CF_3)[OCF_2CF(CF_3)]_sO(C_uF_{2u}O)_v[CF(CF_3)CF_2O]_tCF(CF_3)$—
—$CF_2CF_2CF_2O[CF(CF_3)CF_2O]tCF_2CF_2$— wherein each of s and t is independently an integer of 1 to 120, s+t is an integer of 4 to 121, u is an integer of 1 to 6, and v is an integer of 0 to 10;

each $Z^1$ is independently a divalent linking group, optionally contains an oxygen atom, a nitrogen atom, a fluorine atom or a silicon atom, and may be a group having a cyclic structure and/or an unsaturated bond;

each $Z^2$ is independently a divalent hydrocarbon group having 2 to 20 carbon atoms, may have a cyclic structure, and optionally contains an intermediate ether bond (—O—);

each $Q^1$ is independently a linking group with a valence of (a+1), has a structure with two or more of a hydrogen atom, a carbon atom, an oxygen atom, a silicon atom and a nitrogen atom, and may have a ring shape;

each a is independently an integer of 1 to 10, each b is independently an integer of 0 to 2, each c is independently an integer of 1 to 3, and b and c on one silicon atom satisfy b+c=3; all "a" number of $Z^2$ in the square bracket in formula (1) are bonded to the silicon atom in the $Q^1$ structure;

each R is independently a monovalent hydrocarbon group having 1 to 6 carbon atoms; and each M is independently a group selected from the group consisting of an alkoxy group having 1 to 10 carbon atoms, an alkoxyalkyl group having 2 to 10 carbon atoms, an alkoxyalkoxy group having 2 to 10 carbon atoms, an acyloxy group having 1 to 10 carbon atoms, an alkenyloxy group having 2 to 10 carbon atoms, and a halogen group.

17. An article having a cured film of the fluorine-containing curable composition according to claim 16 on a surface thereof.

18. A fluorine-containing curable composition comprising a curable component (A), which is formed into a cured product by heat or moisture, including at least one compound selected from compounds having a hydrolyzable silyl group, a silanol group, a hydroxyl group, a carboxyl group, an amino group, an epoxy group, a mercapto group, an isocyanate group or a carboxylic anhydride group, with proviso that a compound having a hydrolyzable silyl group is free of a fluorine atom in the molecule, or, a resin composition selected from a urethane resin composition, an epoxy resin composition, a melamine resin composition, an alkyd resin composition or a silicone resin composition, containing at least one selected from the above compounds; and a surface modification component (B) containing a perfluoropolyether compound (b1) of the following general formula (1), the surface modification component (B) containing 0.005 to 50 parts by weight of the perfluoropolyether compound (b1) per 100 parts by weight of the curable component (A) excluding volatile components:

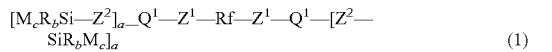
(1)

wherein Rf is a divalent perfluoropolyether group having a numerical average molecular weight of 1,500 to 20,000;

each $Z^1$ is independently a divalent linking group, optionally contains an oxygen atom, a nitrogen atom, a fluorine atom or a silicon atom, and may be a group having a cyclic structure and/or an unsaturated bond;

each $Z^2$ is independently a divalent hydrocarbon group having 2 to 20 carbon atoms, may have a cyclic structure, and optionally contains an intermediate ether bond (—O—);

each $Q^1$ is independently a linking group with a valence of (a+1), has a structure with two or more of a hydrogen atom, a carbon atom, an oxygen atom, a silicon atom and a nitrogen atom, and may have a ring shape, and has a siloxane structure with at least (a+1) number of silicon atoms, an unsubstituted or halogen-substituted silalkylene structure, a silarylene structure, or a combination of two or more thereof, each a is independently an integer of 1 to 10, each b is independently an integer of 0 to 2, each c is independently an integer of 1 to 3, and b and c on one silicon atom satisfy b+c=3; all "a" number of $Z^2$ in the square bracket in formula (1) are bonded to the silicon atom in the Q1 structure;

each R is independently a monovalent hydrocarbon group having 1 to 6 carbon atoms; and each M is independently a group selected from the group consisting of an alkoxy group having 1 to 10 carbon atoms, an alkoxyalkyl group having 2 to 10 carbon atoms, an alkoxyalkoxy group having 2 to 10 carbon atoms, an acyloxy group having 1 to 10 carbon atoms, an alkenyloxy group having 2 to 10 carbon atoms, and a halogen group.

19. An article having a cured film of the fluorine-containing curable composition according to claim 18 on a surface thereof.

* * * * *